(12) United States Patent
Misaki

(10) Patent No.: US 9,632,634 B2
(45) Date of Patent: Apr. 25, 2017

(54) TOUCH PANEL AND DISPLAY DEVICE WITH TOUCH PANEL

(71) Applicant: Sharp Kabushiki Kaisha, Osaka-shi, Osaka (JP)

(72) Inventor: Katsunori Misaki, Yonago (JP)

(73) Assignee: SHARP KABUSHIKI KAISHA, Sakai (JP)

(*) Notice: Subject to any disclaimer, the term of this patent is extended or adjusted under 35 U.S.C. 154(b) by 344 days.

(21) Appl. No.: 14/368,346

(22) PCT Filed: Dec. 20, 2012

(86) PCT No.: PCT/JP2012/083149
§ 371 (c)(1),
(2) Date: Jun. 24, 2014

(87) PCT Pub. No.: WO2013/099776
PCT Pub. Date: Jul. 4, 2013

(65) Prior Publication Data
US 2014/0375909 A1    Dec. 25, 2014

(30) Foreign Application Priority Data

Dec. 28, 2011 (JP) ................................ 2011-288324

(51) Int. Cl.
*G06F 3/044* (2006.01)
*G02F 1/1335* (2006.01)
(Continued)

(52) U.S. Cl.
CPC ............ *G06F 3/044* (2013.01); *G02F 1/1362* (2013.01); *G02F 1/13338* (2013.01);
(Continued)

(58) Field of Classification Search
None
See application file for complete search history.

(56) References Cited

U.S. PATENT DOCUMENTS

2009/0322704 A1* 12/2009 Anno ...................... G06F 3/044
345/174
2010/0033443 A1* 2/2010 Hashimoto ........... G06F 3/0418
345/173
(Continued)

FOREIGN PATENT DOCUMENTS

JP 2004-061687 A 2/2004
JP 2005-005694 A 1/2005

OTHER PUBLICATIONS

Official Communication issued in International Patent Application No. PCT/JP2012/083149, mailed on Apr. 2, 2013.

*Primary Examiner* — Seokyun Moon
*Assistant Examiner* — Douglas Wilson
(74) *Attorney, Agent, or Firm* — Keating & Bennett, LLP

(57) ABSTRACT

A configuration of a touch panel having a terminal structure that enables stable connection between lines and terminals is obtained. A touch panel includes: an insulating substrate (10); a first electrode that is formed on the substrate (10) and extends in a first direction; a second electrode that is formed on the substrate (10) and extends in a second direction that crosses the first direction; a first insulating film (15) that insulates the first electrode and the second electrode from each other; a terminal (18) formed on the substrate (10); and a line (14) that electrically connects a respective one of the first and second electrodes with the terminal (18). The terminal (18) includes a first conductive film (181) that is formed so as to be in contact with a lower surface of the line (14), and a second conductive film (182) that is formed so as to be in contact with an upper surface of the first conductive film (181), and the second conductive film (182) is in contact with the line (14) in such a manner that the contact is achieved only on a side surface of the line (14).

12 Claims, 17 Drawing Sheets

(51) Int. Cl.
*G02F 1/1362* (2006.01)
*G02F 1/1343* (2006.01)
*G02F 1/1333* (2006.01)

(52) U.S. Cl.
CPC .... *G02F 1/13439* (2013.01); *G02F 1/133514* (2013.01); *G02F 1/133528* (2013.01); *G06F 2203/04103* (2013.01); *G06F 2203/04111* (2013.01)

(56) References Cited

U.S. PATENT DOCUMENTS

2010/0295819 A1* 11/2010 Ozeki ..................... G06F 3/044
 345/174
2011/0133183 A1* 6/2011 Yamazaki ........... G02F 1/13458
 257/43
2011/0248970 A1* 10/2011 Koyama ............. G02F 1/13452
 345/204

* cited by examiner

TOUCH PANEL AND DISPLAY DEVICE WITH TOUCH PANEL

TECHNICAL FIELD

The present invention relates to a touch panel and a display device with touch panel, and more specifically relates to a structure of a terminal of a touch panel.

BACKGROUND ART

A touch panel is used in a state of being stacked on a display device. Therefore, sensor electrodes formed in a display area are usually formed with transparent conductive films made of indium tin oxide (ITO), indium zinc oxide (IZO), or the like.

On the other hand, in a frame region other than the display area, metal wiring having a low electric resistance is used in some cases. The metal wiring, however, corrodes when being exposed to atmosphere or moisture. Therefore, if metal wiring is exposed, long term reliability is poor in some cases.

JP2004-61687A discloses a substrate for a liquid crystal display device, the substrate including a plurality of bus lines, an insulating resin layer formed on the bus lines, pixel electrodes formed on the insulating resin layer, thin film transistors connected to the pixel electrodes and the bus lines, and external connection terminals electrically connecting external circuits and the bus lines.

This substrate for a liquid crystal display device includes a first terminal electrode electrically connected to a bus line, a structure that is formed on at least a part of an area on a periphery of the first terminal electrode, a second terminal electrode formed on the first terminal electrode and the structure, and an electrode reconnection area for reconnecting the first and second terminal electrodes. Here, the structure is made of a forming material different from that of the insulating resin layer, and the second terminal electrode is made of the same forming material as that of the pixel electrode.

The above-described document discusses that as the structure is made of a forming material different from that of the insulating resin layer, the second terminal electrode and the structure can be formed in a close contact state.

DISCLOSURE OF THE INVENTION

In the above-described configuration, in the case where the second terminal electrode is made of a metal, corrosion occurs depending on the type of the metal, and long-term reliability is poor in some cases.

On the other hand, in the case where the second terminal electrode is formed with a transparent electrode film made of ITO, IZO, or the like, there arises a problem that such a material has a high electric resistance. Particularly in the case where the terminal has a cross section having a small area, the terminal has a high electric resistance. Further, in the case where an area where a line and the transparent electrode are in contact with each other is small, the contact resistance increases. These are causes that decrease the sensitivity of the touch panel.

It is an object of the present invention to obtain a configuration of a touch panel having a terminal structure that can connect a line and a terminal stably.

A touch panel disclosed herein includes: an insulating substrate; a first electrode that is formed on the substrate and extends in a first direction; a second electrode that is formed on the substrate and extends in a second direction that crosses the first direction; a first insulating film that insulates the first electrode and the second electrode from each other; a terminal formed on the substrate; and a line that electrically connects a respective one of the first and second electrodes with the terminal, wherein the terminal includes a first conductive film that is formed so as to be in contact with a lower surface of the line, and a second conductive film that is formed so as to be in contact with an upper surface of the first conductive film, and the second conductive film is in contact with the line in such a manner that the contact is achieved only on a side surface of the line.

The present invention makes it possible to obtain a configuration of a touch panel having a terminal structure that can connect a line and a terminal stably.

DETAILED DESCRIPTION OF THE EMBODIMENTS

Figure 1:
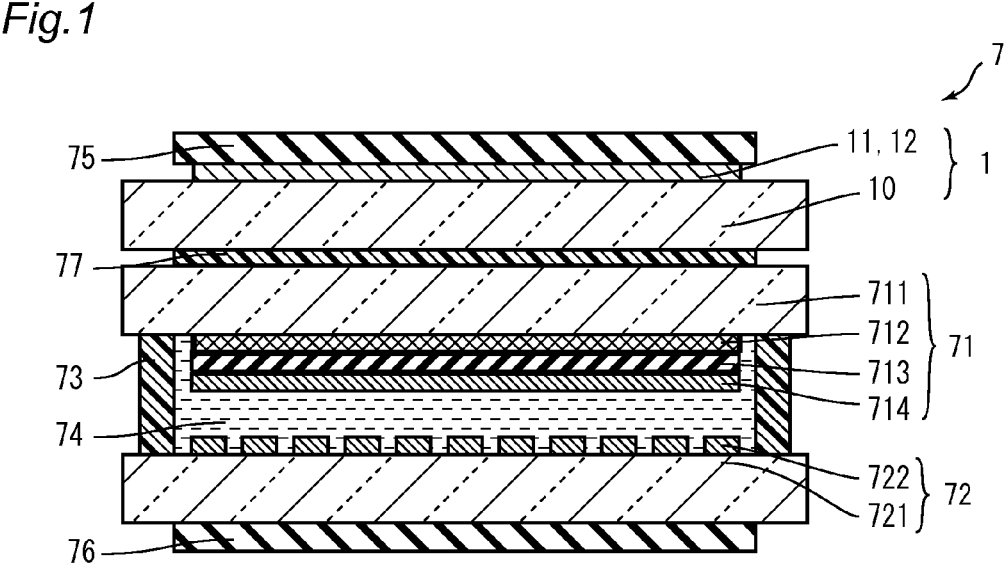
FIG. 1 is a cross-sectional view that shows a schematic configuration of a display device with touch panel according to an embodiment of the present invention.

A touch panel according to one embodiment of the present invention includes: an insulating substrate; a first electrode that is formed on the substrate and extends in a first direction; a second electrode that is formed on the substrate and extends in a second direction that crosses the first direction; a first insulating film that insulates the first electrode and the second electrode from each other; a terminal formed on the substrate; and a line that electrically connects a respective one of the first and second electrodes with the terminal, wherein the terminal includes a first conductive film that is formed so as to be in contact with a lower surface of the line, and a second conductive film that is formed so as to be in contact with an upper surface of the first conductive film, and the second conductive film is in contact with the line in such a manner that the contact is achieved only on a side surface of the line (the first configuration).

According to the above-described configuration, the terminal is composed of two layers of the first conductive film and the second conductive film. Therefore, the terminal can have a cross section having a larger area, whereby an electric resistance thereof can be reduced.

Lines tend to have surfaces altered through the producing process (for example, acidized), and when a conductive film is formed thereon, a contact resistance increases in some cases. According to the above-described configuration, the first conductive film is formed below the line, in contact with the lower surface of the line. Further, the second conductive film is in contact with the line in such a manner that contact is achieved only on side surfaces of the line. This allows the terminal and the line to be connected stably with each other.

The foregoing first configuration can be modified so that the first electrode includes a plurality of first island electrodes that are arranged in the first direction, and a first connection part that connects adjacent ones of the first island electrodes; the second electrode includes a plurality of second island electrodes that are arranged in the second direction, and a second connection part that connect adjacent ones of the second island electrodes; the first island electrodes, the second island electrodes, the first connection part, and the first conductive film are formed with a same material; and the second connection part and the second conductive film are formed with a same material (the second configuration).

The foregoing first configuration can be modified so that the first electrode includes a plurality of first island electrodes that are arranged in the first direction, and a first connection part that connect adjacent ones of the first island electrodes; the second electrode includes a plurality of second island electrodes that are arranged in the second direction, and second connection part that connect adjacent ones of the second island electrodes; the second connection part and the first conductive film are formed with a same material; and the first island electrodes, the second island electrodes, the first connection part, and the second conductive film are formed with a same material (the third configuration).

The foregoing first configuration can be modified so that the first electrode includes a plurality of first island electrodes that are arranged in the first direction, and a first connection part that connect adjacent ones of the first island electrodes; the second electrode includes a plurality of second island electrodes that are arranged in the second direction, and a second connection part that connect adjacent ones of the second island electrodes; the first island electrodes, the second island electrodes, the first connection part, the second connection part, the first conductive film, and the second conductive film are formed with a same material (the fourth configuration).

With the second to fourth configurations, the producing method can be simplified.

Any one of the first to fourth configurations described above preferably further includes a second insulating film that is formed so as to cover the line (the fifth configuration).

According to the above-described configuration, the line is covered with the second insulating film. Therefore, the line is not exposed to atmosphere or moisture. This makes it possible to prevent corrosion of the line, thereby enhancing long-term reliability.

The foregoing fifth configuration can be modified so that the insulating film and the line have a recess in a part of a place where the same overlap the terminal when viewed in a plan view, and the first conductive film and the second conductive film are in contact with each other at the recess (the sixth configuration).

The foregoing fifth configuration can be modified so that the insulating film and the line have an opening in a part of a place where the same overlap the terminal when viewed in a plan view, and the first conductive film and the second conductive film are in contact with each other at the opening (the seventh configuration).

According to the sixth or seventh configuration described above, the area of contact between the first and second conductive films can be increased. Further, paths of currents can be increased. Therefore, the contact resistance between the first and second conductive films can be reduced.

Any one of the first to seventh configurations described above is preferably modified so that in the place where the first conductive film and the line overlap, the first conductive film has a width wider than that of the line (the eighth configuration).

According to the foregoing configuration, the area of contact between the first conductive film and the line can be increased. Therefore, the contact resistance between the first conductive film and the line can be reduced.

Any one of the first to eighth configurations is preferably modified so that the first conductive film is formed so as to overlap an entirety of the line when viewed in a plan view (the ninth configuration).

According to the foregoing configuration, the first conductive film and the line are formed so as to overlap. This makes it possible to reduce an electric resistance. Further, by providing such a redundant structure, conduction can be maintained even if one of the same is disconnected. Therefore, the reliability can be enhanced.

A display device with touch panel according to one embodiment of the present invention includes: a liquid crystal display device; and the touch panel according to any one of the first to ninth configurations (the first configuration of the display device with touch panel).

[Embodiment]

Hereinafter, embodiments of the present invention are explained in detail, with reference to the drawings. Identical or equivalent portions in the drawings are denoted by the same reference numerals and repetitive explanations are omitted. It should be noted that in order to make the explanation easy to understand, in the drawings referred to hereinafter, the configurations are shown in a simplified or schematic manner, or illustration of a part of constituent members is omitted, in some cases. Further, dimensional ratios between constituent members shown in the drawings do not necessarily faithfully show actual dimensional ratios.

[Overall Configuration]

FIG. 1 is a cross-sectional view showing a schematic configuration of a display device with touch panel 7 according to one embodiment of the present invention. The display device with touch panel 7 includes a touch panel 1, a color filter substrate 71, a thin film transistor (TFT) substrate 72, a sealing member 73, liquid crystal 74, polarizing plates 75 and 76, and a pasting material 77.

The color filter substrate 71 and the TFT substrate 72 are arranged so as to face each other. At the peripheral part of the color filter substrate 71 and the TFT substrate 72, the sealing member 73 is provided, and the liquid crystal 74 is sealed therein. On a surface of the color filter substrate 71 on a side opposite to the liquid crystal 74 side, the touch panel 1 is bonded with the pasting material 77. On a surface of the touch panel 1 on a side opposite to the color filter substrate 71 side, the polarizing plate 75 is arranged. On a surface of the TFT substrate 72 on a side opposite to the liquid crystal 74 side, the polarizing plate 76 is arranged.

The touch panel 1 is a touch panel of an electrostatic capacitance type, and includes an insulating substrate 10, and sensor electrodes (X electrodes 11, Y electrodes 12, etc.), which will be described in detail below. The X electrodes 11 and the Y electrodes 12 are formed in a lattice shape. The X electrodes 11 and the Y electrodes 12 form electrostatic capacitance between the same and a finger or the like having approached to the touch panel 1. The touch panel 1 detects the position of the finger or the like based on a change in this electrostatic capacitance.

The color filter substrate 71 includes an insulating substrate 711, a black matrix 712, color filters 713, and a common electrode 714. The common electrode 714 is formed uniformly over a substantially entire surface of the substrate 711.

The TFT substrate 72 includes an insulating substrate 721, pixel electrodes 722, and TFTs (not shown). The pixel electrodes 722 and the TFTs are formed in matrix on the substrate 721. It should be noted that as TFTs, those made of amorphous silicon, indium zinc gallium oxide (IZGO), or the like can be used, and it is preferable to use those made of IZGO, which has greater electron mobility.

The display device with touch panel 7 drives the TFTs of the TFT substrate 72 to generate an electric field across an arbitrary pixel electrode 722 and the common electrode 714. This electric field causes a change in the alignment of the liquid crystal 74. Light entering from the polarizing plate 76 side is polarized in a particular direction by the polarizing plate 76. The polarization direction of the light having entered the liquid crystal 74 is changed according to the alignment of the liquid crystal 74. Then, only light polarized in the particular direction is transmitted through the polarizing plate 75.

In this way, the display device with touch panel 7 can control transmission/non-transmission of light at an arbitrary pixel electrode 722. Light transmitted through the pixel electrode 722 is colored by the color filters 713. The color filters 713 of a plurality of colors, for example, red, green, and blue, may be arranged regularly, whereby a variety of colors can be displayed by additive color mixture. The black matrix 712 blocks light from areas other than the areas where the pixel electrodes 722 are formed, thereby improving contrast.

So far, the schematic configuration of the display device with touch panel 7 has been explained. In the display device with touch panel 7, the polarizing plate 75 is arranged on a surface of the touch panel 1, the surface being on an outer side (the side opposite to the color filter substrate 71 side). However, the display device with touch panel 7 may have such a configuration that the polarizing plate 75 is arranged on a surface of the color filter substrate 71, the surface being on the side opposite to the liquid crystal 74 side, and the touch panel 1 is laminated thereon.

[Configuration of Touch Panel]

Hereinafter, the configuration of the touch panel 1 is described in detail.

Figure 2:
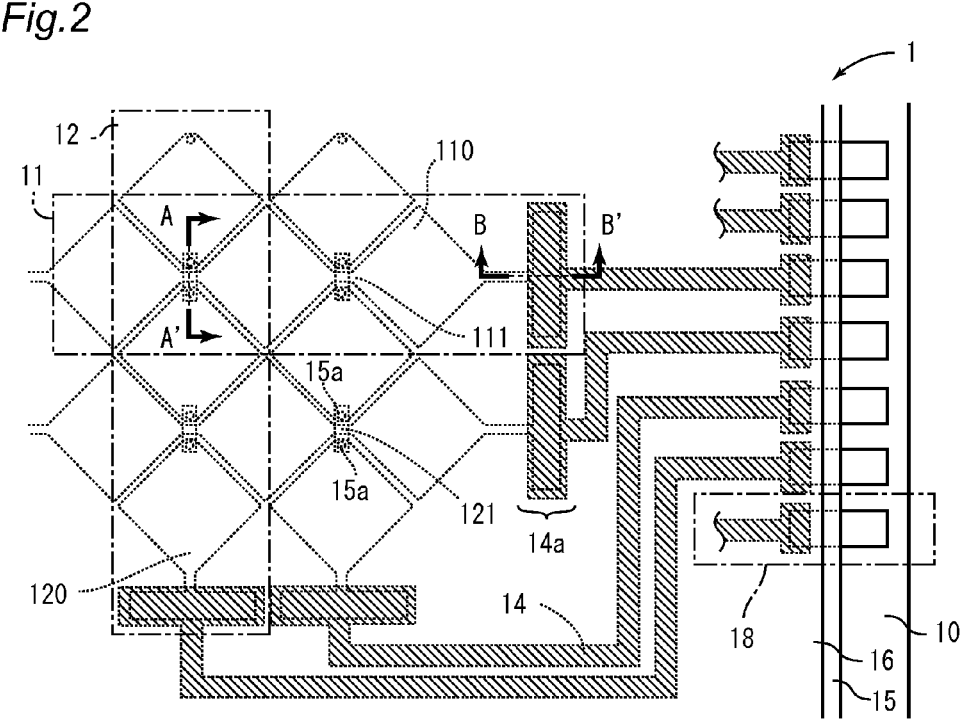
FIG. 2 is a plan view showing a schematic configuration of a touch panel according to Embodiment 1 of the present invention.
Figure 3:
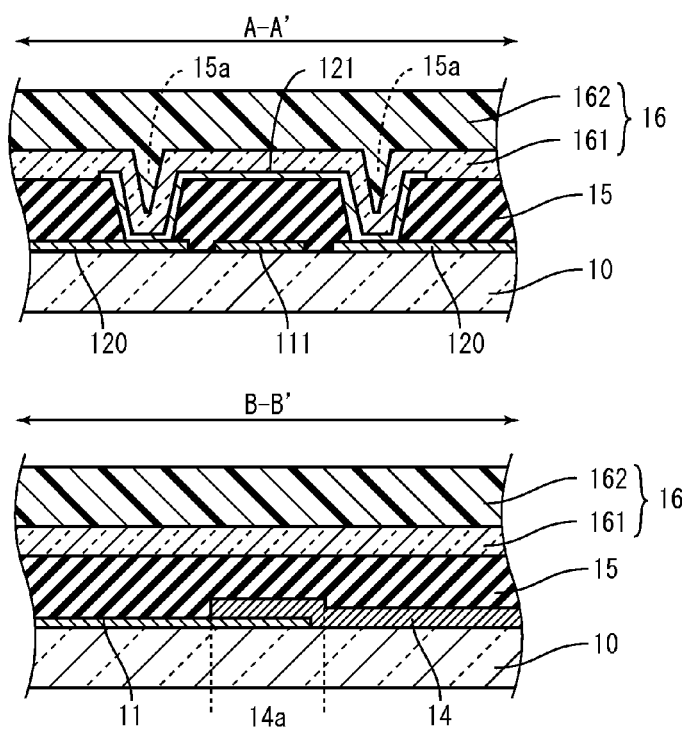
FIG. 3 is cross-sectional views taken along a line A-A', and a line B-B' shown in FIG. 2.

FIG. 2 is a plan view schematically showing a schematic configuration of a touch panel 1 according to one embodiment of the present invention. FIG. 3 is cross-sectional views taken along a line A-A', and a line B-B' in FIG. 2. The touch panel 1 includes a substrate 10, X electrodes 11, Y electrodes 12, lines 14, an insulating film 15, and a protection film 16. It should be noted that in FIG. 2, the lines 14 are hatched, in order to improve the visibility of the drawing.

The X electrode 11 includes a plurality of island electrodes 110 that are arranged in the horizontal direction of FIG. 2, and connection parts 111 that connect adjacent ones of the island electrodes 110. The island electrodes 110 and the connection parts 111 are integrally formed so as to be continuous.

The Y electrode 12 includes a plurality of island electrodes 120 that are arranged in the vertical direction of FIG. 2, and connection parts 121 that connect adjacent ones of the island electrodes 120. The island electrodes 120 and the connection parts 121 are formed in different layers with an insulating film 15 being interposed therebetween, as shown in FIG. 3. The island electrodes 120 and the connection parts 121 are in contact with each other via a plurality of contact holes 15a formed in the insulating film 15.

This configuration allows the X electrode 11 and the Y electrode 12 to cross each other, with the insulating film 15 being interposed therebetween whereby they are insulated from each other.

In the vicinities of an end of the substrate 10, terminals 18 are formed. The X electrodes 11 and Y electrodes 12, and the terminals 18 are electrically connected by the lines 14.

As shown in FIG. 2, reconnection parts 14a between the X electrodes 11 and the lines 14 are formed in larger areas as compared with the other parts. This is intended to reduce a contact resistance between the X electrodes 11 and the lines 14. The same applies to the Y electrodes 12 and the lines 14.

Further, as shown in FIG. 3, in the reconnection part 14a between the X electrode 11 and the line 14, the X electrode 11 is formed in contact with a lower surface of the lines 14. Here, "in contact with a lower surface" indicates such a state that the electrode 11 partially gets under the line 14 and is in contact with the same. The reconnection part between the Y electrode 12 and the line 14 has an identical configuration, though it is not shown in the drawings.

The insulating film 15 is formed so as to cover the island electrodes 110 of the X electrodes 11, the connection parts 111, the island electrodes 120 of the Y electrodes 12, and the lines 14, entirely. The insulating film 15 also covers parts of the substrate 10 and the terminals 18. On the insulating film 15, further, the protection film 16 is formed. The terminals 18 are partially exposed, without being covered with any of the insulating film 15 and the protection film 16. The exposed portions of the terminals 18 are connected to the driving circuit via a flexible printed circuit (FPC) or the like.

It should be noted that the protection film 16 has a two-layer structure composed of a protection film 161 made of an inorganic material and a protection film 162 made of an organic material. The inorganic protection film 161 is generally denser than the organic protection film 162, and prevents permeation of moisture from outside and the like. Therefore, it is possible to prevent corrosion of the lines 14 due to moisture and the like by forming the inorganic protection film 161. On the other hand, the organic protection film 162 has elasticity as compared with the inorganic protection film 161, and can reduce impact due to unexpected contact and the like. Further, with the organic protection film 162, the surface of the touch panel 1 is flattened.

[Configuration of Terminal]
[Embodiment 1]

Figure 4:
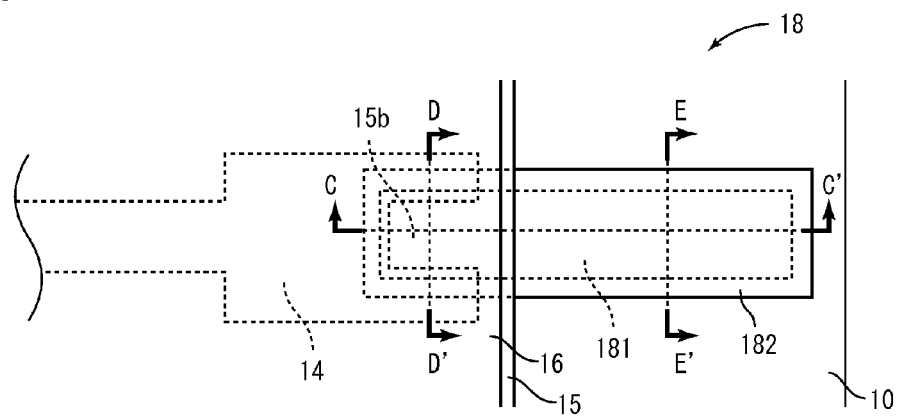
FIG. 4 is a plan view showing a schematic configuration of a terminal according to Embodiment 1.
Figure 5:
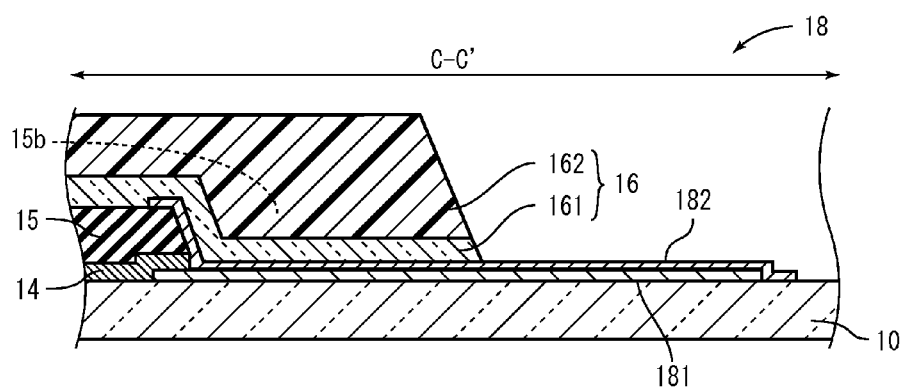
FIG. 5 is cross-sectional views taken along a line C-C', a line D-D', and a line E-E' shown in FIG. 4.
Figure 5:
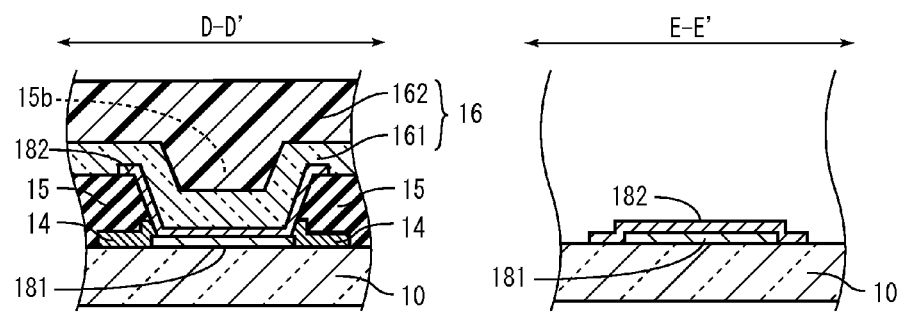

Next, the configuration of the terminal 18 is described below. FIG. 4 is a plan view showing a configuration of the terminal 18 according to Embodiment 1 of the present invention. FIG. 5 is cross-sectional views taken along a line C-C', a line D-D', and a line E-E' in FIG. 4. The terminal 18 includes a first conductive film 181 and a second conductive film 182.

As shown in FIG. 5, the first conductive film 181 is formed in contact with a lower surface of the line 14. Here, "in contact with a lower surface" indicates a state where the first conductive film 181 partially gets under the line 14, and is in contact with the same. The second conductive film 182 is formed in contact with an upper surface of the first conductive film 181. Here, "in contact with an upper surface" indicates a state where the first conductive film 182 partially overlaps the first conductive film and is in contact with the same.

The insulating film 15 and the lines 14 have recesses 15b in an area where the lines 14 and the terminals 18 overlap when viewed in a plan view. The second conductive film 182 and the line 14 are in contact with each other at the recess 15b, in such a manner that contact is achieved only on side surfaces of the line 14. The first conductive film 181 and the second conductive film 182 are in contact with each other at the recesses 15b, in an area where they overlap the protection film 16 when viewed in a plan view. It should be noted that in an area where the first conductive film 181 and the second conductive film 182 do not overlap the protection film 16 when viewed in a plan view (in an area where the terminals 18 are exposed outward), the first conductive film 181 and the second conductive film 182 are in contact with each other throughout the entire area.

[Method for Producing Touch Panel 1]

Hereinafter, a method for producing the touch panel 1 is explained, with reference to FIGS. 6A to 6F. It should be noted that the views in FIGS. 6A to 6F are cross-sectional views taken along the line A-A' in FIG. 2 as well as the line D-D' and the line E-E' in FIG. 4.

Figure 6A:
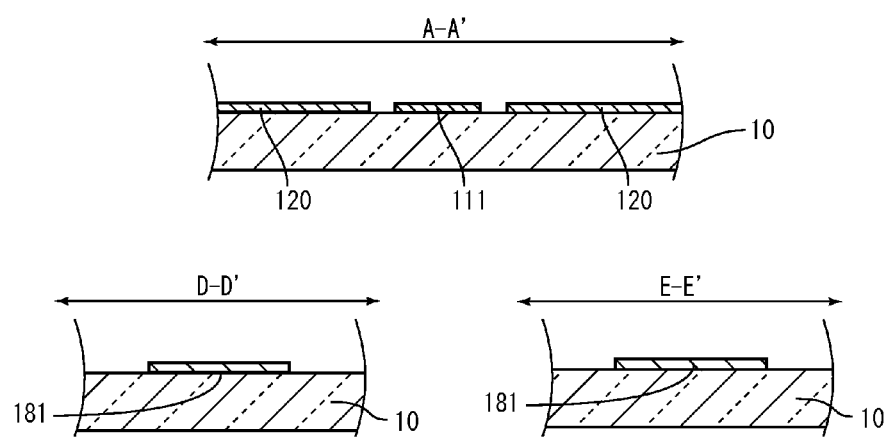
FIG. 6A is cross-sectional views for explaining a method for producing a touch panel according to Embodiment 1 of the present invention.

As shown in FIG. 6A, the connection parts 111 of the X electrodes 11, the island electrodes 120 of the Y electrode 12, and the first conductive films 181 of the terminals 18 are formed on the substrate 10. The substrate 10 is, for example, a glass substrate. Though not shown in FIG. 6A, the island electrodes 110 of the X electrodes 11 (see FIG. 2) are also formed at the same time.

First of all, a uniform transparent conductive film is formed on the substrate 10 by sputtering or CVD (chemical vapor deposition). The transparent conductive film is, for example, a film of ITO of IZO. The transparent conductive film has a thickness of, for example, 10 to 50 nm, though the thickness is not limited particularly.

The transparent conductive film formed on the substrate 10 is patterned by photolithography. More specifically, masks of photoresist are formed in places where the island electrodes 110 and 120, the connection parts 111, and the first conductive films 181 are to be formed. Then, the transparent conductive film in the rest places are removed by etching. An arbitrary etching method may be used, and oxalic acid, mixed acid of phosphoric acid/acetic acid/nitric acid, or the like, may be used, for example.

After the patterning is completed, annealing is carried out in a temperature range of 200 to 250° C. Through this annealing, the transparent conductive film (the island electrodes 110, 120, the connection parts 111, the first conductive films 181), which were amorphous, are polycrystallized.

Figure 6B:
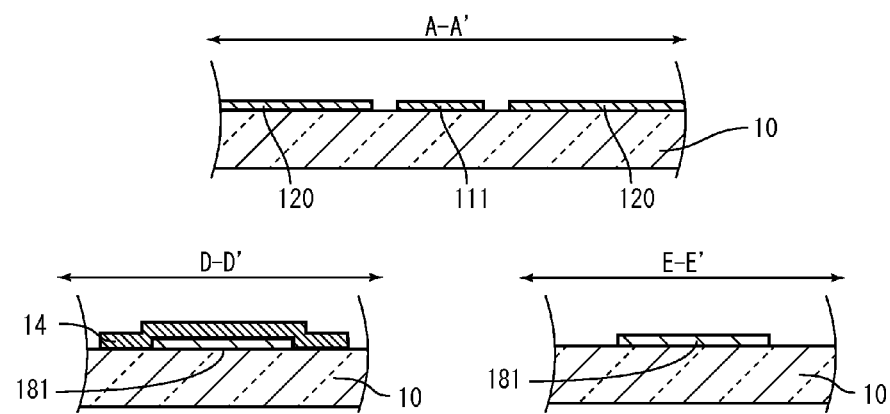
FIG. 6B is cross-sectional views for explaining the method for producing a touch panel according to Embodiment 1 of the present invention.

Next, as shown in FIG. 6B, the lines 14 are formed. First of all, a metal film is formed by sputtering or vapor deposition over an entire surface, covering the island electrodes 110, 120, the connection parts 111, and the first conductive films 181. The metal film preferably has a low resistance, and Al is used, for example. However, Al is easily corroded by alkali, and when Al and ITO are brought into direct contact with each other, galvanic corrosion occurs due to differences in ionization tendency. Therefore, it is preferable to form a laminate structure with a metal having a high corrosion resistance. Therefore, as the metal film, for example, a laminate film such as a film of MoNb/Al/MoNb, a film of MoN/Al/MoN, a film of Mo/Al/Mo, or the like is used preferably. The metal film has a thickness of, for example, 0.3 to 1.0 μm, though the thickness is not limited particularly.

The metal film formed over the entire surface of the substrate 10 is patterned by photolithography. More specifically, masks of photoresist are formed at places where the lines 14 are to be formed. Then, the metal film in the rest places are removed by etching. An arbitrary etching method may be used, and mixed acid of phosphoric acid/acetic acid/nitric acid, or the like, can be used, for example.

Figure 6C:
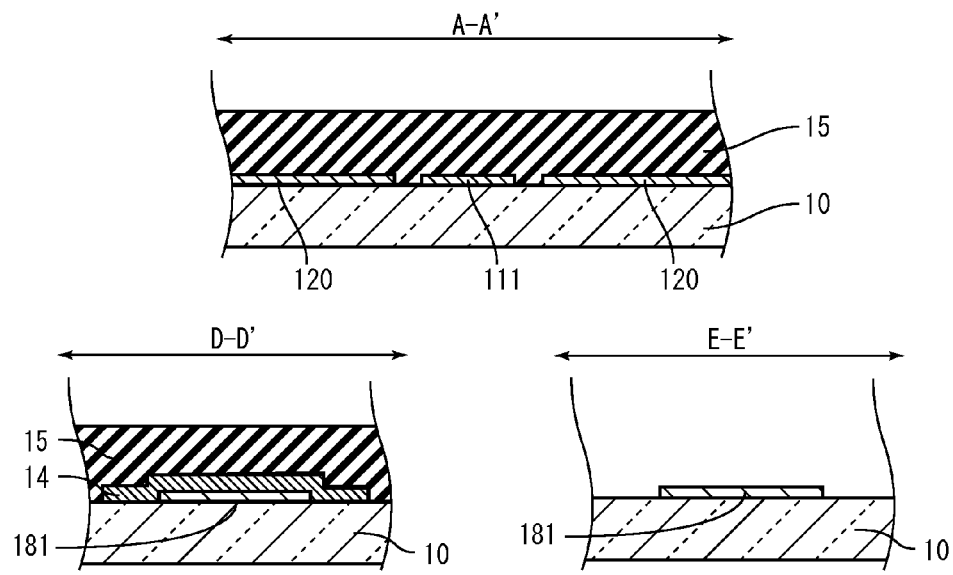
FIG. 6C is cross-sectional views for explaining the method for producing a touch panel according to Embodiment 1 of the present invention.
Figure 6D:
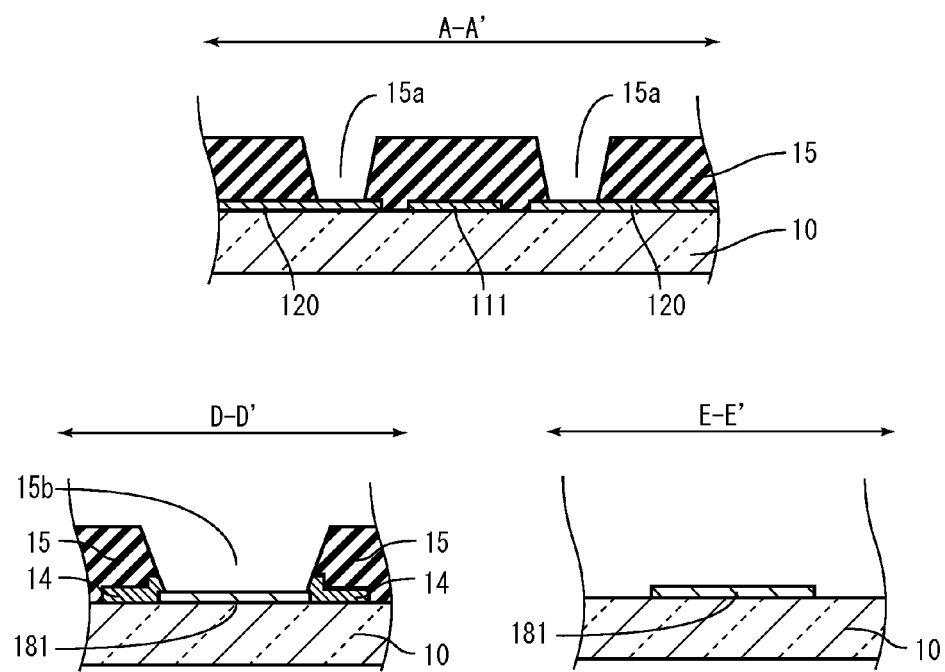
FIG. 6D is cross-sectional views for explaining the method for producing a touch panel according to Embodiment 1 of the present invention.

Next, as shown in FIG. 6C, the insulating film 15 is formed so as to cover an entire surface of the substrate 10. Subsequently, as shown in FIG. 6D, the contact holes 15a and the crecesses 15b are formed in the insulating film 15. When the recesses 15b are formed in the insulating film 15, the recesses are formed in the lines 14 as well at the same time.

Either an organic insulator, or an inorganic insulator may be used as the insulating film 15.

First of all, a case where an organic insulator is used as the insulating film 15 is explained. The organic insulator is, for example, a photoresist containing an acrylic resin, a novolac resin, or the like. A photoresist is uniformly applied over an entire surface of the substrate 10 with a spin coater or a slit coater. The insulating film 15 insulates the X electrodes 11 and the Y electrodes 12, and moreover, also plays a role of protecting the lines 14 and the like. Therefore, the insulating film 15 is preferably thicker. The insulating film 15 has a thickness of, for example, 1.5 to 3.0 μm, though the thickness is not limited particularly.

The insulating film 15 formed over an entire surface of the substrate 10 is patterned by photolithography, whereby the contact holes 15a and the recesses 15b are formed.

Further, etching is carried out using the insulating film 15 as a mask, whereby recesses are formed in the lines 14 as well. An arbitrary etching method may be used, and mixed acid of phosphoric acid/acetic acid/nitric acid, or the like, may be used, for example.

The following description explains a case where an inorganic insulator is used as the insulating film 15. The inorganic insulator is, for example, SiN, SiO$_2$, SiON, or the like. A uniform inorganic film made of any of these substances is formed over an entire surface of the substrate 10 by CVD. In this case as well, the insulating film 15 preferably has a greater thickness, and the thickness thereof is preferably twice or more the thickness of the lines 14.

The insulating film 15 formed over the entire surface of the substrate 10 is patterned by photolithography, whereby the contact holes 15a and the recesses 15b are formed. More specifically, masks of photoresist are formed in places other than the places where the contact holes 15a and the recesses 15b are to be formed. Then, the contact holes 15a and the recesses 15b are formed by etching. An arbitrary etching method may be used, and for example, dry etching using a fluorine-containing gas can be used.

Further, with this mask remaining, the lines 14 are etched, so that recesses are formed in the lines 14. An arbitrary etching method may be used, and mixed acid of phosphoric acid/acetic acid/nitric acid, or the like, can be used, for example.

Figure 6E:
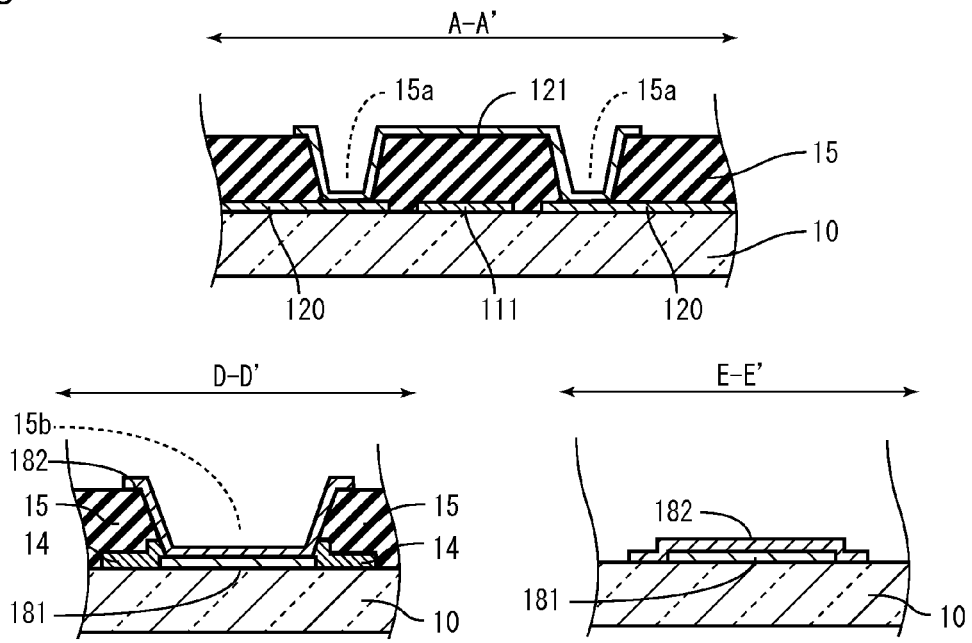
FIG. 6E is cross-sectional views for explaining the method for producing a touch panel according to Embodiment 1 of the present invention.

Next, as shown in FIG. 6E, the connection parts 121 of the Y electrodes 12, and the second conductive films 182 of the terminals 18 are formed. By sputtering or CVD, a uniform transparent conductive film is formed. The transparent conductive film is, for example, ITO or IZO. The transparent conductive film has a thickness of, for example, 10 to 50 nm, though the thickness is not limited particularly.

The transparent conductive film formed on the substrate 10 is patterned by photolithography. More specifically, masks of photoresist are formed in places where the connection parts 121 and the second conductive films 182 are to be formed. Then, the transparent conductive film in the rest places are removed by etching. An arbitrary etching method may be used, and oxalic acid, mixed acid of phosphoric acid/acetic acid/nitric acid, or the like, may be used, for example.

After the patterning is completed, annealing may be carried out for polycrystallizing the connection parts 121 and the second conductive films 182.

Figure 6F:
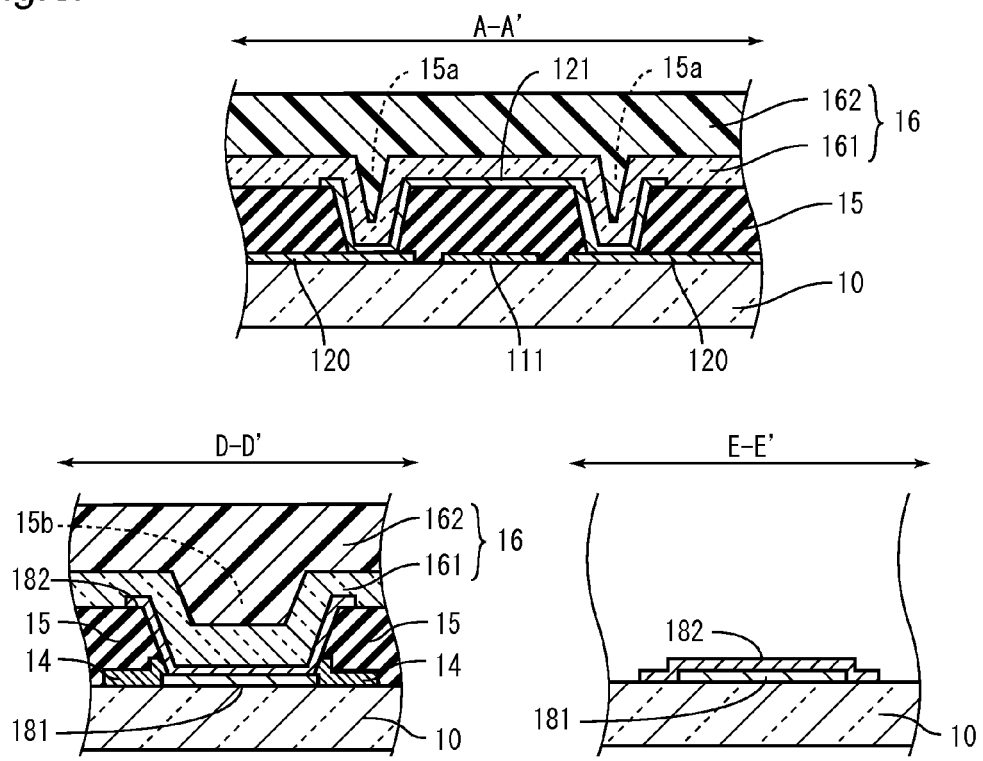
FIG. 6F is cross-sectional views for explaining the method for producing a touch panel according to Embodiment 1 of the present invention.

Finally, as shown in FIG. 6F, the protection film 16 is formed so as to cover substantially an entire surface of the substrate 10. The protection film 16 is formed by laminating the protection film 161 made of an inorganic material and the protection film 162 made of an organic material, as described above.

The inorganic protection film 161 is made of, for example, SiN, SiO$_2$, SiON, or the like. Over the entire surface of the substrate 10, a homogeneous inorganic film made of such a substance is formed by CVD. Here, a metal mask or the like is used so that the terminals 18 are partially exposed. The protection film 161 has a thickness of, for example, 50 to 500 nm, though the thickness is not limited particularly.

The organic protection film 162 is, for example, a film made of an acrylic resin. A uniform photoresist is formed over an entire surface of the substrate 10 with a spin coater or a slit coater. Here, a metal mask or the like is used so that the terminals 18 are partially exposed. The protection film 162 has a thickness of, for example, 1.5 to 3.0 μm, though the thickness is not limited particularly.

So far, the configuration and the producing method of the touch panel 1 of Embodiment 1 of the present invention have been explained.

According to the configuration of the touch panel 1 according to the present embodiment, the terminal 18 is composed of two layers that are the first conductive film 181 and the second conductive film 182. Therefore, the terminal 18 is allowed to have a cross section having a larger area, whereby the electric resistance can be reduced.

The lines 14 containing a metal have surfaces thereof altered (for example, acidized) in the producing process, and in the case where a conductive film is formed thereon, the contact resistance increases in some cases. According to the present embodiment, after the first conductive films 181 are formed, the lines 14 are formed so as to be in contact with the first conductive films 181. In other words, the first conductive films 181 are formed so as to be in contact with the lower surfaces of the lines 14. This makes it possible to stabilize the contact resistance.

In the present embodiment, the recesses 15b are formed in the insulating film 15 and the lines 14, and at the recesses 15b, the first conductive films 181 and the second conductive films 182 are brought into contact with each other. As mentioned above, in the case where conductive films are formed on the lines 14, the contact resistance increases in some cases. Therefore, there is possibility that a portion between the line 14 and the second conductive film 182 has a high resistance. In the present embodiment, by forming the recess 15b, the second conductive film 182 and the line 14 are brought into contact with each other in such a manner that contact is achieved only on the side surfaces of the line 14. Further, by forming the recess 15b, an area of contact between the first conductive film 181 and the second conductive film 182 is increased. This makes it possible to increase paths of current. Therefore, this makes it possible to cause the terminals 18 to have a low resistance.

In the present embodiment, the island electrodes 110 of the X electrodes 11, the connection parts 111, the island electrodes 120 of the Y electrodes 12, and the first conductive films 181 of the terminals 18 are formed simultaneously. Further, the connection parts 121 of the Y electrodes 12 and the second conductive films 182 of the terminals 18 are formed simultaneously. In other words, the terminals 18 are formed in the same step and with the same material as the X electrodes 11 and the Y electrodes 12 are formed, and another step is not needed. This makes it possible to simplify the producing process.

The X electrodes 11 and the Y electrodes 12 are formed thin in some cases in order to increase the light transmission degree. Even in such a case, by laminating two layers of the first conductive film 181 and the second conductive film 182 thereby increasing the area of the cross section of the terminal 18, the electric resistance can be decreased.

It should be noted that in the present embodiment, the insulating film 15 is formed over substantially an entire surface of the substrate 10, and such a configuration that the island electrodes 120 and the connection parts 121 of the Y electrodes 12 are brought into contact via the contact holes 15a. However, any configuration is applicable as long as the X electrodes 11 and the Y electrodes 12 are insulated from each other. For example, the configuration may be such that the insulating film 15 is formed only in places where the X electrodes 11 and the Y electrodes 12 cross each other.

Further, in the present embodiment, a configuration of the protection film 16 obtained by laminating the protection film 161, which is inorganic, and the protection film 162, which is organic, in this order is mentioned as an example. The protection film 16, however, may be composed of either one of the protection films 161 and 162 alone. Still further, the order of lamination may be reversed.

In the present embodiment, when the recesses 15b are formed in the insulating film 15, recesses are also formed in the lines 14 at the same time. The recesses of the lines 14 may be formed when the lines 14 are formed. However, it is more preferable that the recesses 15b are formed in the insulating film 15 and the lines 14 simultaneously as in the present embodiment, because in such a case precise alignment can be achieved.

COMPARATIVE EXAMPLE

Figure 7:
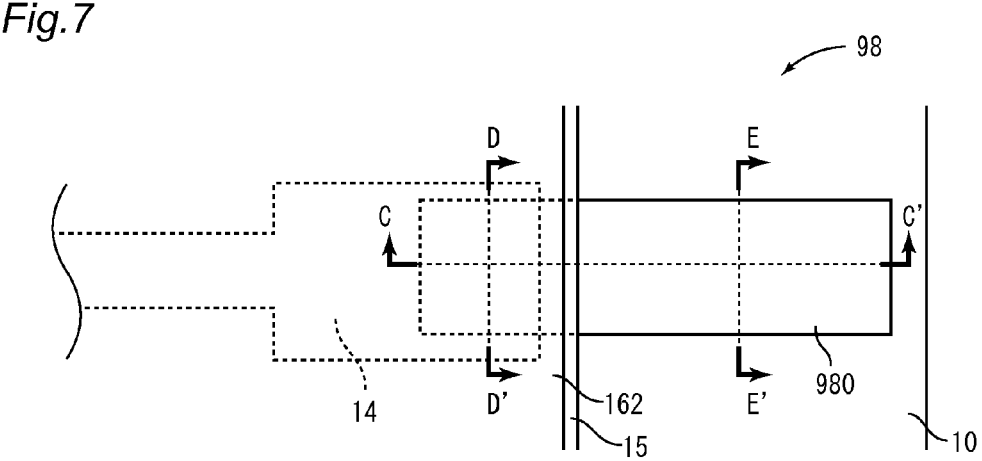
FIG. 7 is a plan view showing a schematic configuration of a terminal part according to a comparative example.
Figure 8:
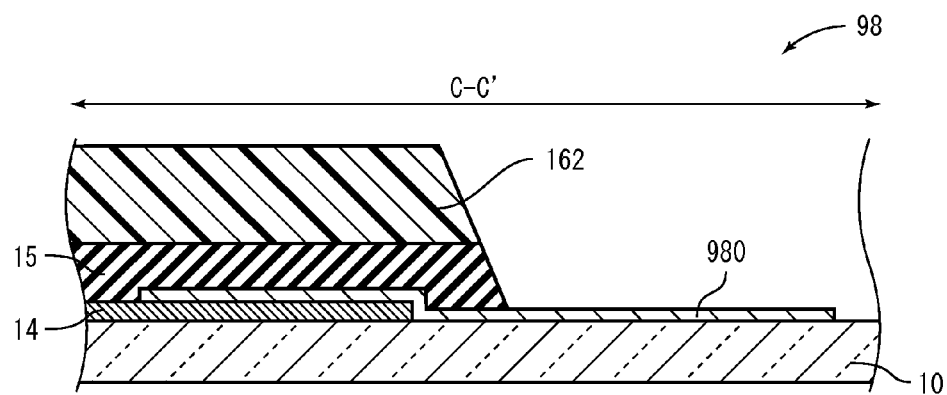
FIG. 8 is cross-sectional views taken along a line C-C', a line D-D', and a line E-E' in FIG. 7.
Figure 8:
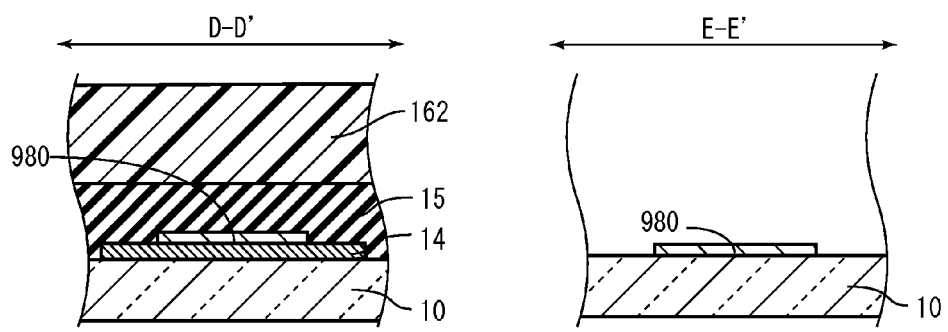

Here, in order to explain effects of the touch panel 1, a configuration according to a virtual comparative example is discussed. FIG. 7 is a plan view showing a schematic configuration of a terminal 98 according to the comparative example. FIG. 8 are cross-sectional views taken along a line C-C', a line D-D', and a line E-E' shown in FIG. 7.

The terminal 98 is formed with a one-layer conductive film 980. The conductive film 980 is formed in contact with an upper surface of a line 14, as shown in FIG. 8.

The lines 14 are exposed to atmosphere and moisture during the producing process, for example, during an etching step, a cleaning step, and the like. Due to this, surfaces of the lines 14 are altered in some cases. Therefore, a contact resistance between the conductive film 980 formed in contact with the upper surface of the line 14 and the line 14 increases in some cases.

Further, in the case where the conductive film 980 is formed thin, or in the case where the conductive film 980 has a narrow width, the terminal 98 has a high electric resistance.

In the terminal 18 provided in the touch panel 1 according to the present embodiment, the first conductive film 181 is formed in contact with the lower surface of the line 14. Therefore, the first conductive film 181 and the line 14 can be in contact with each other stably. Further, the terminal 18 is formed in the two-layer structure composed of the first conductive film 181 and the second conductive film 182. Therefore, the area of the cross section thereof can be increased, whereby the electric resistance can be decreased.

[Modification Example of Embodiment 1]

Figure 9:
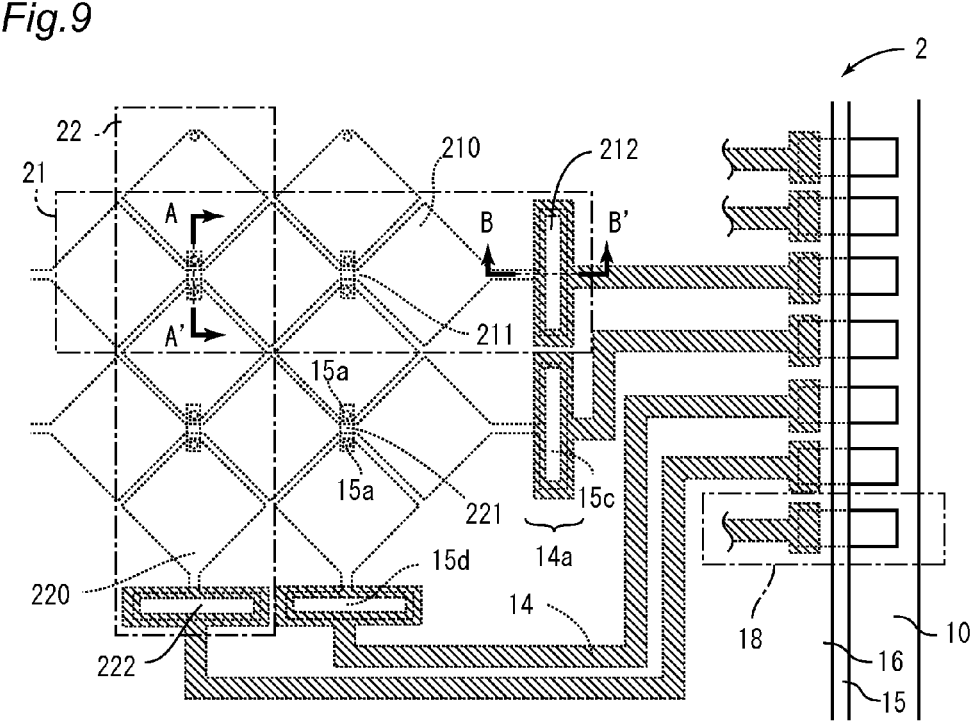
FIG. 9 is a plan view showing a schematic configuration of a touch panel according to a modification of Embodiment 1 of the present invention.
Figure 10:
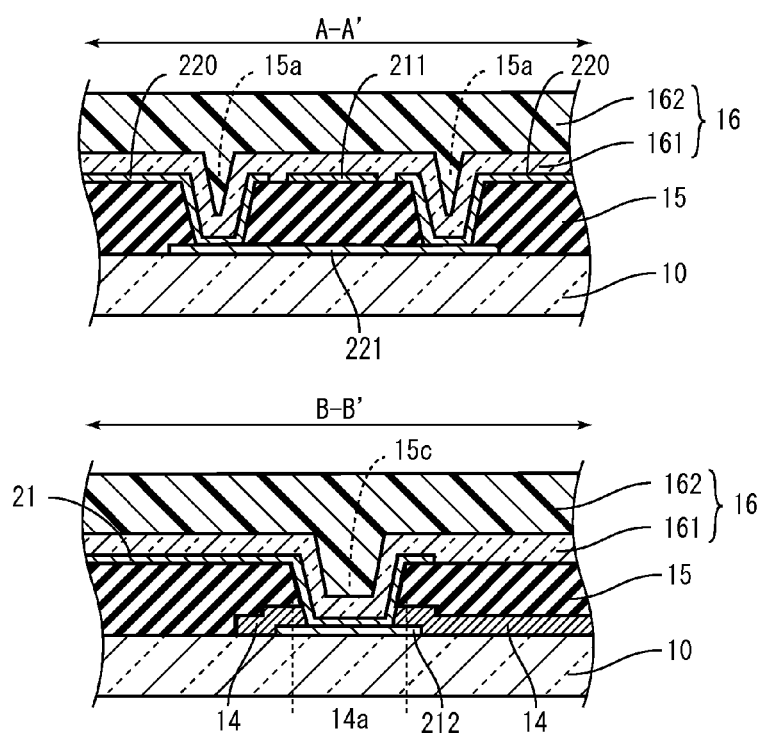
FIG. 10 is cross-sectional views taken along a line A-A' and a line B-B' shown in FIG. 9.

The display device with touch panel 7 may be provided with a touch panel 2 described below, in place of the touch panel 1. FIG. 9 is a plan view showing a schematic configuration of the touch panel 2 according to a modification example of Embodiment 1 of the present invention. FIG. 10 is cross-sectional views taken along a line A-A' and a line B-B' shown in FIG. 9. It should be noted that in FIG. 9, the lines 14 are hatched, in order to improve the visibility of the drawing.

The touch panel 2 includes a substrate 10, X electrodes 21, Y electrodes 22, lines 14, an insulating film 15, a protection film 16, and terminals 18. The touch panel 2 is different from the touch panel 1 regarding the configurations of the X electrode and the Y electrode.

The X electrode 21 includes island electrodes 210, connection parts 21, and a lead electrode 212. The Y electrode 22 includes island electrodes 220, connection parts 221, and a lead electrode 222.

As is the case with the X electrode 11, the X electrode 21 includes a plurality of the island electrodes 210 that are arranged in the horizontal direction of FIG. 10, and the connection parts 211 that connect adjacent ones of the island electrodes 210. The island electrodes 210 and the connection parts 211 are integrally formed so as to be continuous. Unlike the X electrode 11, the X electrode 21 is formed in a layer above the insulating film 15, as shown in FIG. 11.

As is the case with the Y electrode 12, the Y electrode 22 includes a plurality of the island electrodes 220 that are arranged in the vertical direction of FIG. 10, and the connection parts 221 that connect adjacent ones of the island electrodes 220. As shown in FIG. 10, the island electrodes 220 are formed in a layer above the insulating film 15, and the connection parts 221 are formed in a layer below the insulating film 15. The island electrodes 220 and the connection parts 221 are in contact with each other via a plurality of contact holes 15a formed in the insulating film 15.

The X electrodes 21 and the Y electrodes 22, and the line 14 are connected with each other via contact holes 15c formed in the insulating film 15.

As shown in FIG. 10, in a reconnection part 14a for reconnection between the X electrode 21 and the line 14, a lead electrode 212 is formed. The line 14 overlaps the lead electrode 212. The line 14 has an opening at a position corresponding to the position of the contact hole 15c of the insulating film 15. Then, via the contact hole 15c and the opening of the line 14, the X electrode 21 and the lead electrode 212 are in contact with each other. With this configuration, the X electrode 21, the lead electrode 212, and the line 14 are electrically connected with one another. Such a configuration is provided because, as described above, when a conductive film is brought into contact with the upper surface of the line 14, a stable contact resistance cannot be obtained in some cases. The Y electrode 22, the lead electrode 222, and the line 14 are also electrically connected with one another by an identical configuration, though this is not shown in the drawings.

[Method for Producing Touch Panel 2]

Hereinafter, a method for producing the touch panel 2 is schematically explained, with reference to FIGS. 11A to 11F. It should be noted that FIGS. 11A to 11F are cross-sectional views taken along a line A-A' in FIG. 9, a line D-D', and a line E-E' in FIG. 4. Regarding the same steps as those for the touch panel 1, explanations are omitted as required.

Figure 11A:
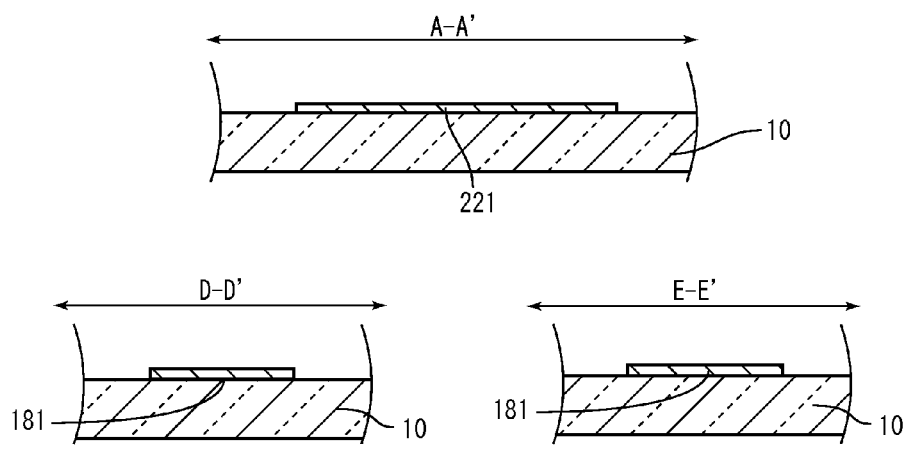
FIG. 11A is cross-sectional views for explaining a method for producing a touch panel according to a modification example of Embodiment 1 of the present invention.

First, as shown in FIG. 11A, the connection parts 221 of the Y electrodes 22, and the first conductive films 181 of the terminals 18 are formed on the substrate 10. Though it is not shown in FIG. 11A, the lead electrodes 212 of the X electrodes 21 (see FIGS. 9 and 10) and the lead electrodes 222 of the Y electrodes 22 (see FIG. 9) are formed simultaneously.

Figure 11B:
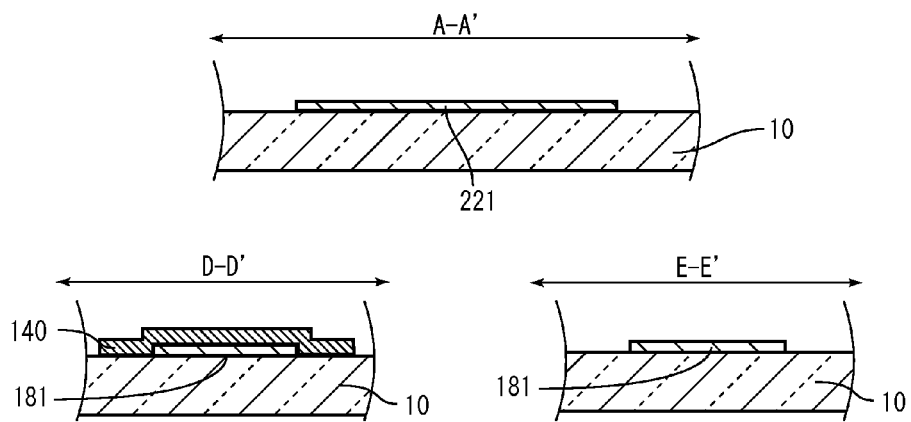
FIG. 11B is cross-sectional views for explaining the method for producing a touch panel according to the modification example of Embodiment 1 of the present invention.

Next, as shown in FIG. 11B, the lines 14 are formed.

Figure 11C:
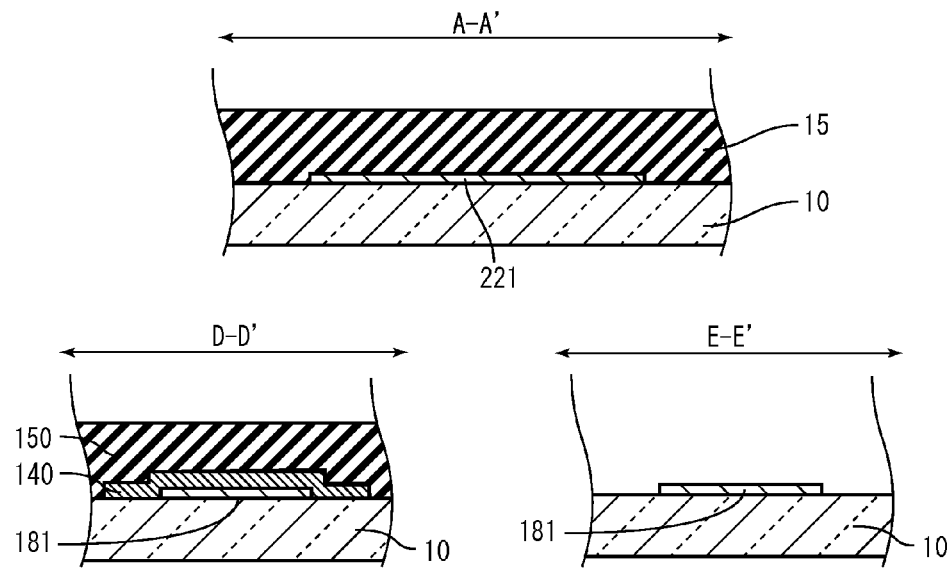
FIG. 11C is cross-sectional views for explaining the method for producing a touch panel according to the modification example of Embodiment 1 of the present invention.
Figure 11D:
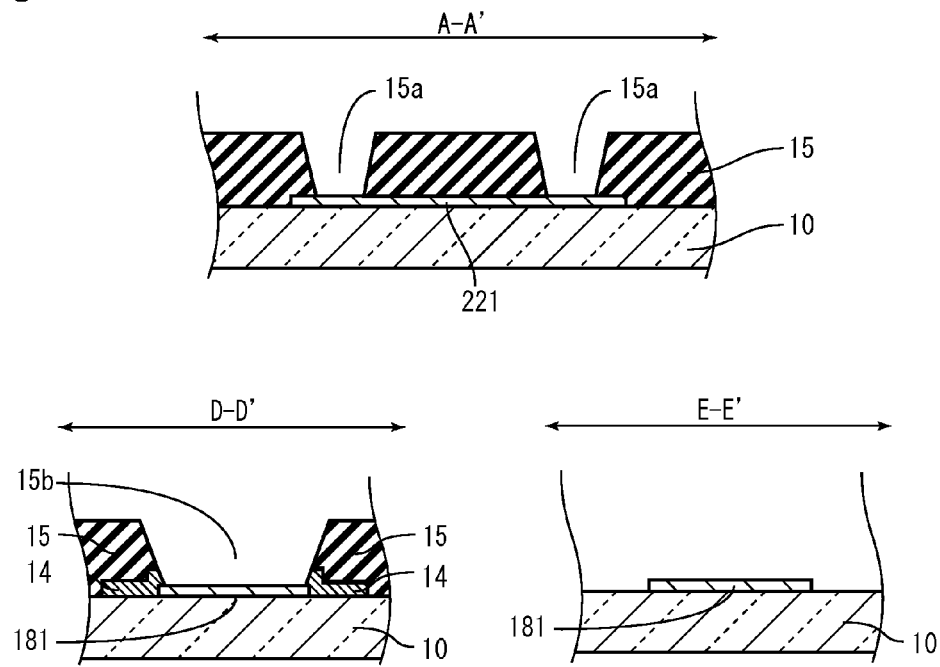
FIG. 11D is cross-sectional views for explaining the method for producing a touch panel according to the modification example of Embodiment 1 of the present invention.

Next, as shown in FIG. 11C, the insulating film 15 is formed so as to cover an entire surface of the substrate 10. Subsequently, as shown in FIG. 11D, the contact holes 15a and the recesses 15b are formed in the insulating film 15. Though it is not shown in FIG. 11D, the contact holes 15c (see FIGS. 9 and 10) are also formed at the same time.

When the recesses 15b are formed in the insulating film 15, recesses are also formed in the lines 14 at the same time. Further, when the contact holes 15c are formed in the insulating film 15, openings are also formed in the lines 14 at the same time.

Figure 11E:
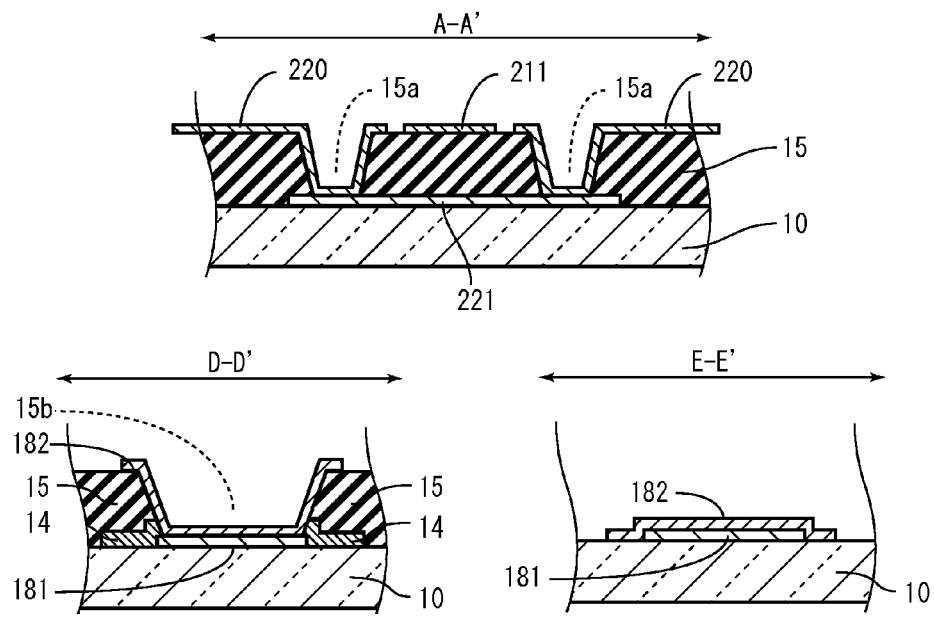
FIG. 11E is cross-sectional views for explaining the method for producing a touch panel according to the modification example of Embodiment 1 of the present invention.

Next, as shown in FIG. 11E, the connection parts 211 of the X electrodes 21, the island electrodes 220 of the Y electrodes 22, and the second conductive films 182 of the terminals 18 are formed. Though it is not shown in FIG. 11E, island electrodes 220 of the X electrodes 21 (see FIG. 9) are formed at the same time.

Figure 11F:
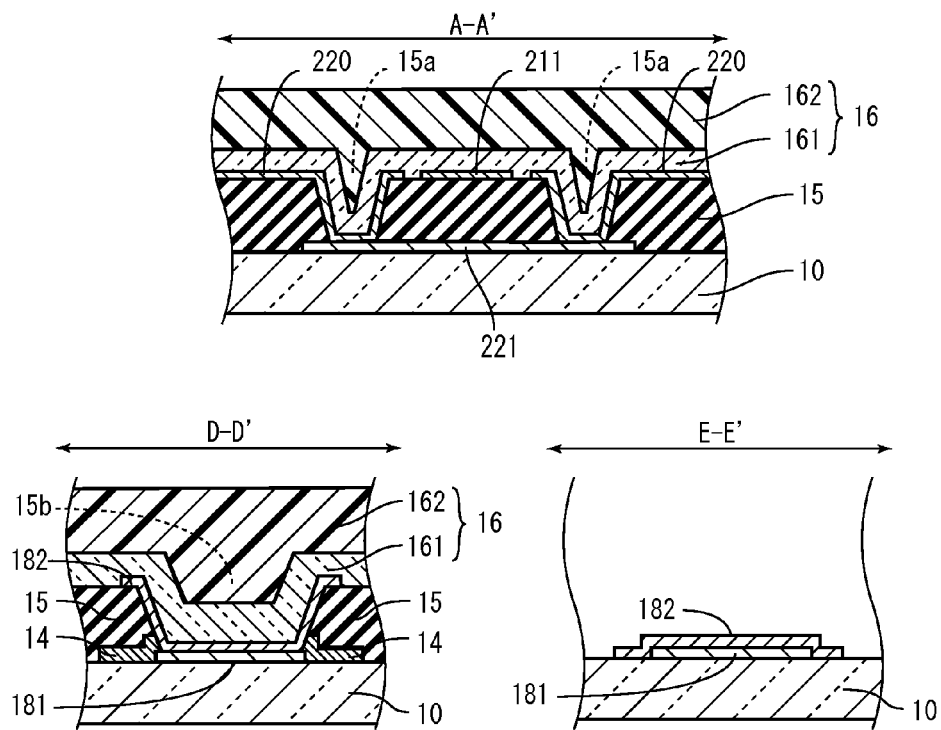
FIG. 11F is cross-sectional views for explaining the method for producing a touch panel according to the modification example of Embodiment 1 of the present invention.

Finally, as shown in FIG. 11F, the protection film 16 is formed so as to cover substantially an entire surface of the substrate 10.

So far, the configuration and the producing method of the touch panel 2 of a modification example of Embodiment 1 of the present invention have been explained.

In the touch panel 1, the island electrodes 110, 120, and the connection parts 111, as well as the first conductive films 181 are formed simultaneously, and the connection parts 121 and the second conductive films 182 are formed simultaneously. In contrast, in the touch panel 2, the connection parts 221, the lead electrodes 212 and 222, and the first conductive films 181 are formed simultaneously, and the island electrodes 210, 220, the connection parts 211, and the second conductive films 182 are formed simultaneously.

With the touch panel 2, the same effects as those in the case of the touch panel 1 can be obtained. Therefore, by the touch panel 2, a variation of the configuration of the touch panel is obtained.

[Embodiment 2]

The touch panel 1 or 2 may include terminals 28, 38, or 48 described below, in place of the terminals 18.

Figure 12:
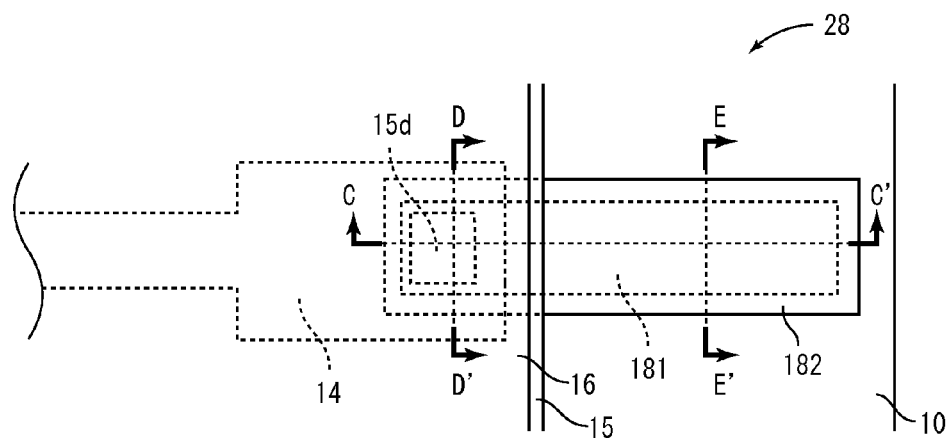
FIG. 12 is a plan view showing a schematic configuration of a terminal according to Embodiment 2 of the present invention.
Figure 13:
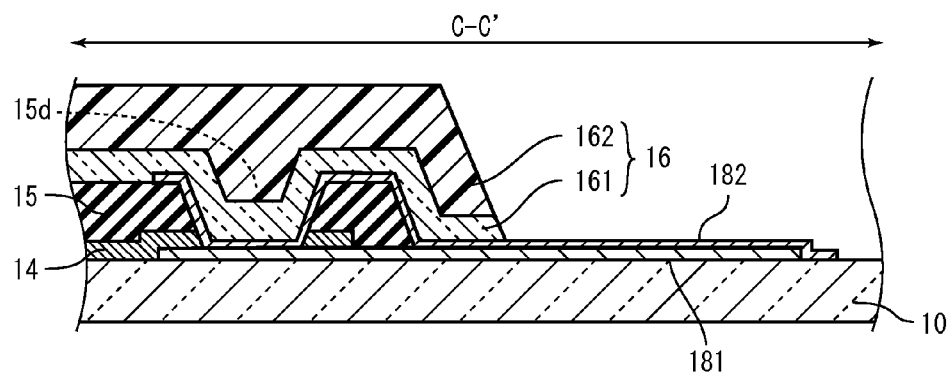
FIG. 13 is cross-sectional views taken along a line C-C', a line D-D', and a line E-E' in FIG. 12.
Figure 13:
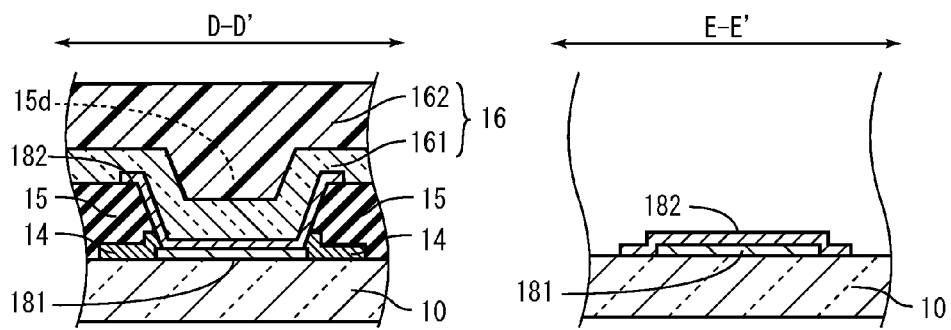

FIG. 12 is a plan view showing a configuration of a terminal 28 according to Embodiment 2 of the present invention. FIG. 13 is cross-sectional views taken along a line C-C', a line D-D', and a line E-E' in FIG. 12.

The terminal 28 includes a contact hole (opening) 15d in a place of the recess 15b that the terminal 18 has. In other words, the insulating film 15 and the line 14 have a contact hole 15d, in a part of a place where the line 14 and the terminal 28 overlap when viewed in a plan view. The second conductive film 182 and the line 14 are in contact with each other at the contact hole 15b in such a manner that contact is achieved only on side surfaces of the line 14. The first conductive film 181 and the second conductive film 182 are in contact with each other at the contact hole 15d, in a place where they overlap the protection film 16 when viewed in a plan view. It should be noted that in a place where the first conductive film 181 and the second conductive film 182 do not overlap the protection film 16 when viewed in a plan view (in a place where the terminal 28 are exposed outward), the first conductive film 181 and the second conductive film 182 are in contact with each other throughout thoroughly.

With the terminal 28 of the present embodiment, the electric resistance can be decreased. Further, stable contact with the lines 14 can be achieved.

[Embodiment 3]

Figure 14:
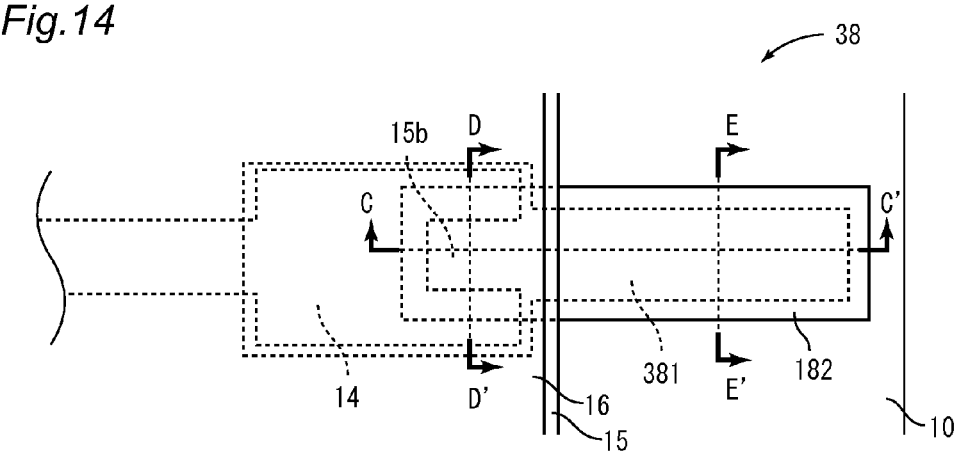
FIG. 14 is a plan view showing a schematic configuration of a terminal according to Embodiment 3 of the present invention.
Figure 15:
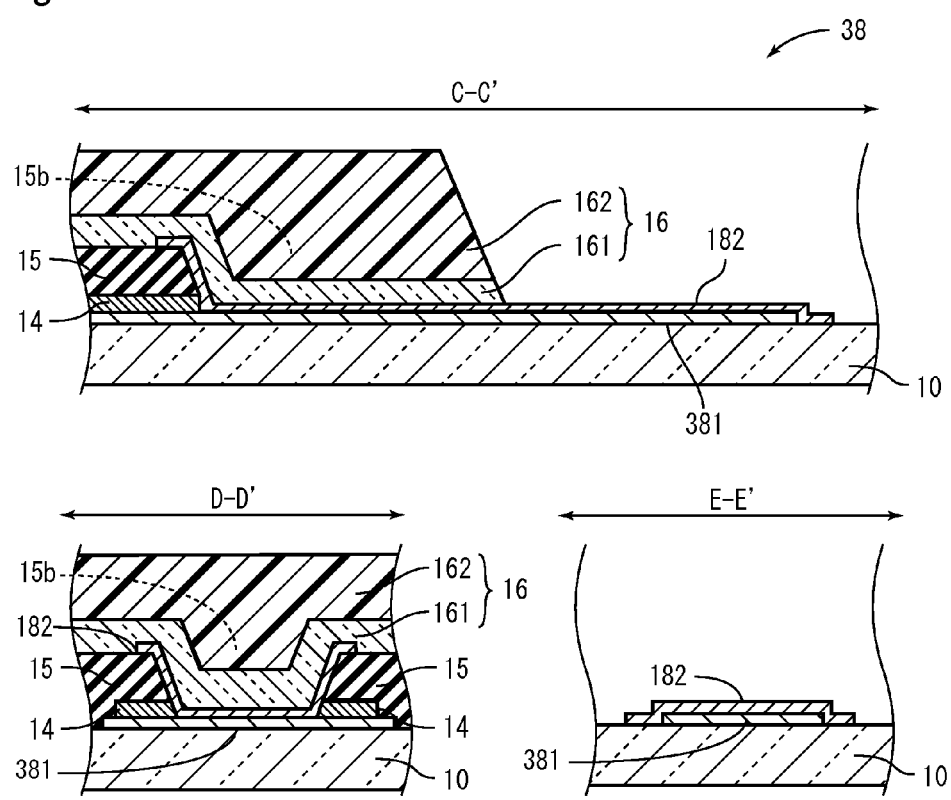
FIG. 15 is cross-sectional views taken along a line C-C', a line D-D', and a line E-E' shown in FIG. 14.

FIG. 14 is a plan view showing a configuration of a terminal 38 according to Embodiment 3 of the present invention. FIG. 15 is cross-sectional views taken along a line C-C', a line D-D', and a line E-E' in FIG. 14.

The terminal 38 includes a first conductive film 381 and a second conductive film 182. In other words, the terminal 38 is different from the terminal 18 regarding the configuration of the first conductive film. As shown in FIG. 14, the first conductive film 381 is formed so as to have a width greater than that of the line 14, in a place where the first conductive film 381 and the line 14 overlap.

This causes an area of contact between the first conductive film 381 and the line 14 to increase. Therefore, the contact resistance can be decreased, and stable connection can be achieved.

[Embodiment 4]

Figure 16:
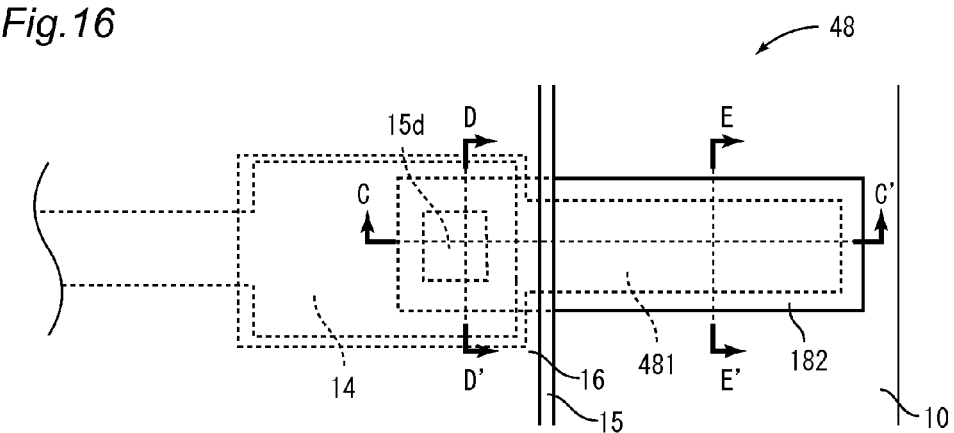
FIG. 16 is a plan view showing a schematic configuration of a terminal according to Embodiment 4 of the present invention.
Figure 17:
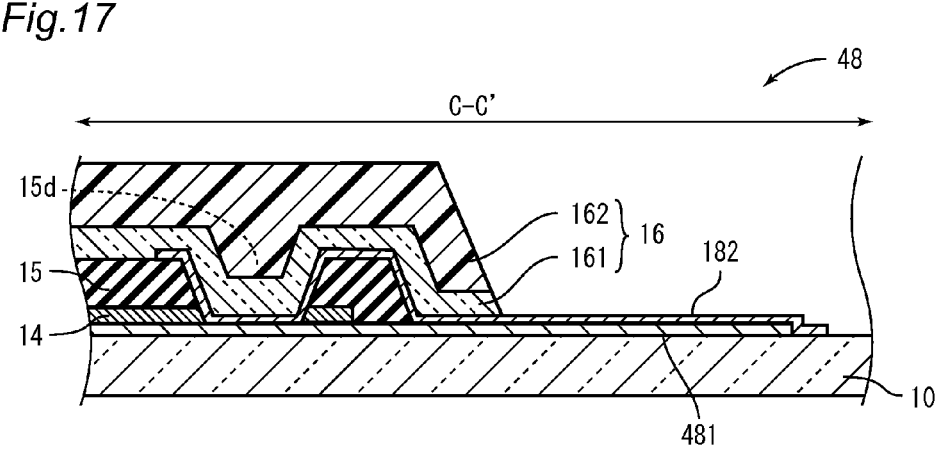
FIG. 17 is cross-sectional views taken along a line C-C', a line D-D', and a line E-E' in FIG. 16.
Figure 17:
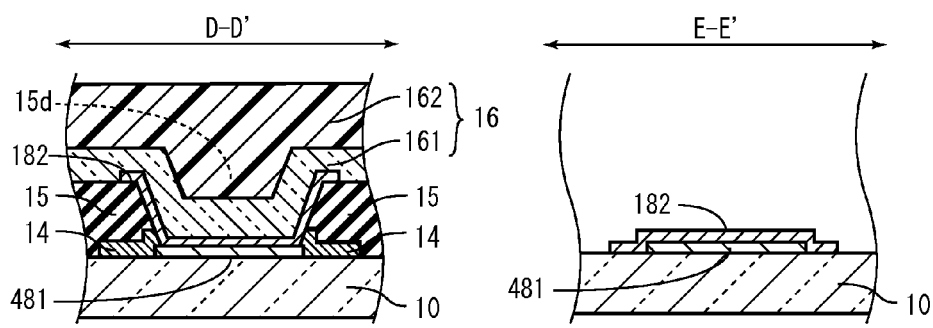

FIG. 16 is a plan view showing a configuration of a terminal 48 according to Embodiment 4 of the present invention. FIG. 17 is cross-sectional views taken along a line C-C', a line D-D', and a line E-E' in FIG. 16.

The terminal 48 includes a first conductive film 481 and a second conductive film 182. As is the case with the first conductive film 381 of the terminal 38, the first conductive film 481 is formed so as to have a width greater than that of the line 14, in a place where the first conductive film 481 and the line 14 overlap. The terminal 48 includes a contact hole 15d in place of the recess 15b provided in the terminal 38

In the present embodiment as well, by increasing the area of contact between the first conductive film 481 and the line 14, the contact resistance can be decreased.

Other Embodiments

Figure 18:
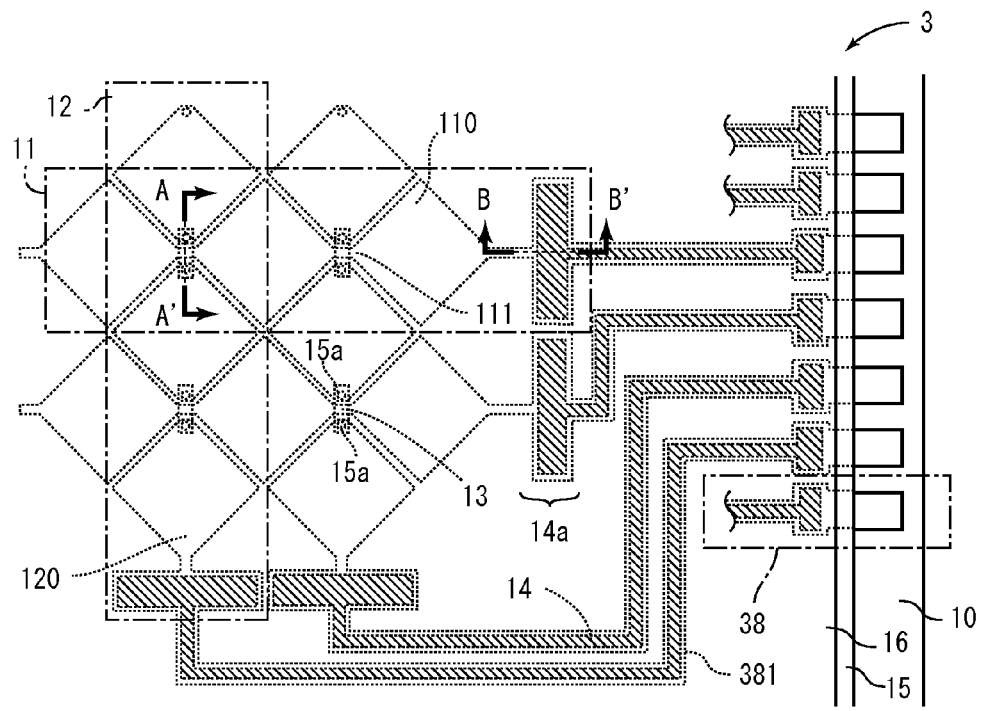
FIG. 18 is a plan view showing a schematic configuration of a touch panel according to another embodiment of the present invention.
Figure 19:
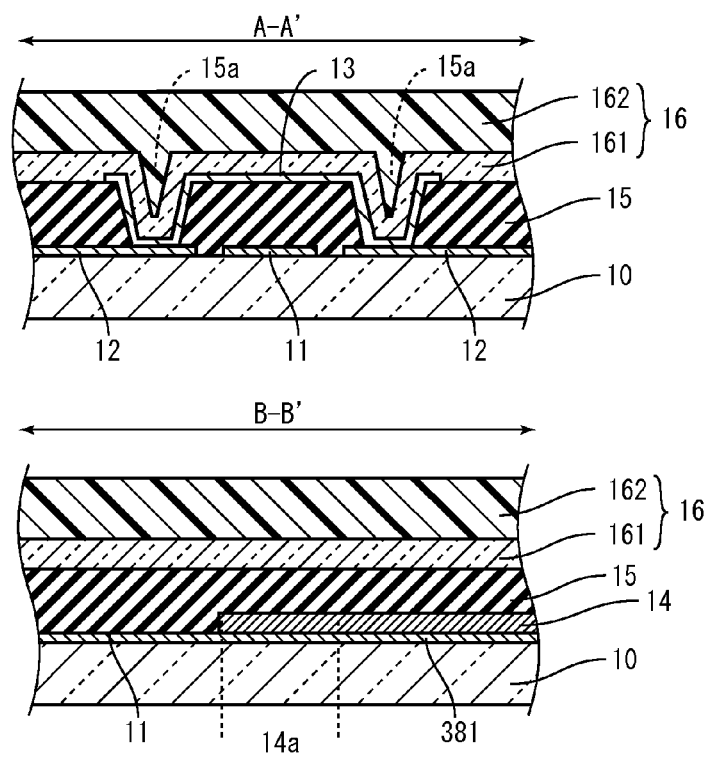
FIG. 19 is cross-sectional views taken along a line A-A' and a line B-B' in FIG. 18.

FIG. 18 is a plan view showing a schematic configuration of a touch panel 3 according to another embodiment of the present invention. FIG. 19 is cross-sectional views taken along a line A-A' and a line B-B' in FIG. 18. The touch panel 3 includes a substrate 10, X electrodes 11, Y electrodes 12, lines 14, an insulating film 15, a protection film 16, and terminals 38. It should be noted that in FIG. 18, the lines 14 are hatched, in order to improve the visibility of the drawing.

In the touch panel 3, a first conductive film 381 of the terminal 38 is formed so as to overlap an entirety of the line 14 when viewed in a plan view. Further, as shown in FIG. 19, the X electrode 11 and the first conductive film 381 are integrally formed so as to be continuous. Though it is not shown in the drawings, the island electrode 120 of the Y electrode 12 and the first conductive film 381 are also integrally formed so as to be continuous.

According to the present embodiment, the first conductive film 381 and the lines 14 overlap. This causes an electric resistance to decrease. Further, by forming such a redundant structure, conduction can be maintained even if one of the same is disconnected. Therefore, the reliability can be enhanced.

It should be noted that in the present embodiment, the width of the lines 14 is narrower than the width of the first conductive film 381. However, the width of the lines 14 and the width of the first conductive film 381 may be equal, or the width of the lines 14 may be wider than the width of the first conductive film 381. Further, the touch panel 3 may include the terminal 48 in place of the terminal 38.

Figure 20:
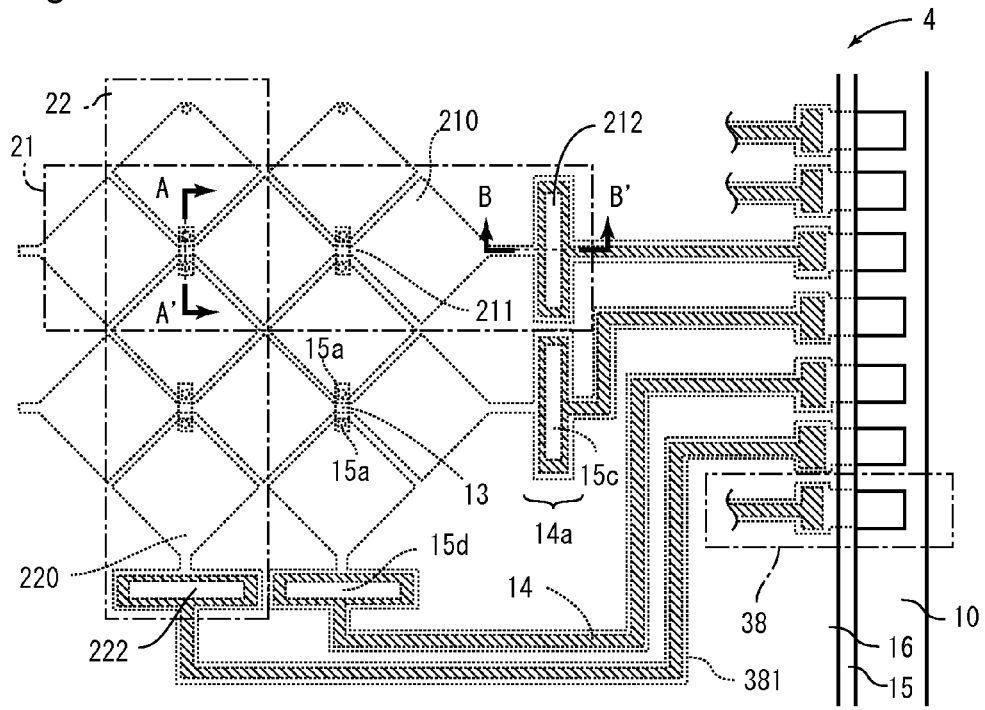
FIG. 20 is a plan view showing a schematic configuration of a touch panel according to still another embodiment of the present invention.
Figure 21:
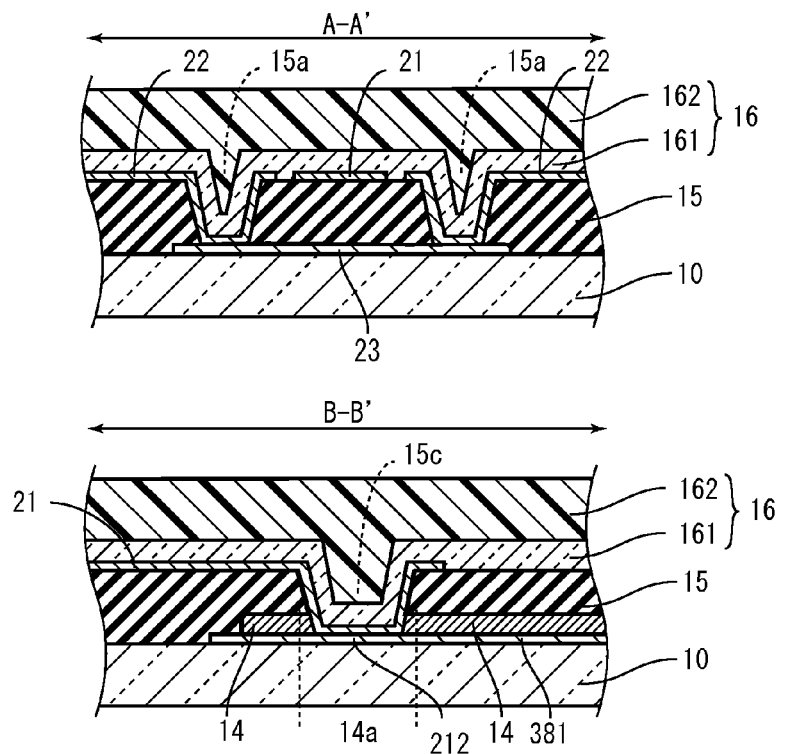
FIG. 21 is cross-sectional views taken along a line A-A' and a line B-B' in FIG. 20.

FIG. 20 is a plan view showing a schematic configuration of a touch panel 4 according to still another embodiment of the present invention. FIG. 21 are cross-sectional views taken along a line A-A' and a line B-B' in FIG. 20. The touch panel 4 includes a substrate 10, X electrodes 21, Y electrodes 22, lines 14, an insulating film 15, a protection film 16, and terminals 38. It should be noted that in FIG. 20, the lines 14 are hatched, in order to improve the visibility of the drawing.

In the touch panel 4, the first conductive film 381 of the terminal 38 is formed so as to overlap an entirety of the line 14 when viewed in a plan view. Further, as shown in FIG. 21, the lead electrode 212 of the X electrode 11 and the first conductive film 381 are integrally formed so as to be continuous. Though it is not shown in the drawing, the lead electrode 222 of the Y electrode 22 and the first conductive film 381 are integrally formed so as to be continuous.

According to the present embodiment, the first conductive film 381 and the line 14 are formed so as to overlap. This causes an electric resistance to decrease. Further, by forming such a redundant structure, conduction can be maintained even if one of the same is disconnected. Therefore, the reliability can be enhanced.

It should be noted that in the present embodiment, the width of the lines 14 is narrower than the width of the first conductive film 381. However, the width of the lines 14 and the width of the first conductive film 381 may be equal, or the width of the lines 14 may be wider than the width of the first conductive film 381. Further, the touch panel 4 may include the terminal 48 in place of the terminal 38.

Figure 22:
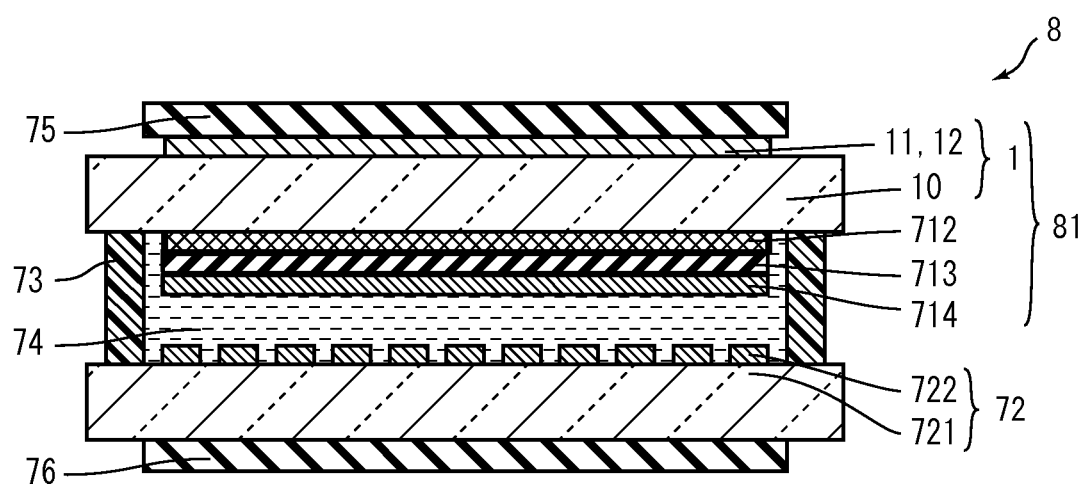
FIG. 22 is a cross-sectional view showing a schematic configuration of a display device with touch panel according to another embodiment of the present invention.

FIG. 22 is a cross-sectional view showing a schematic configuration of a display device with touch panel 8 according to another embodiment of the present invention. The display device with touch panel 8 includes a color-filter-equipped touch panel substrate 81, a TFT substrate 72, a sealing member 73, liquid crystal 74, and polarizing plates 75 and 76.

In the display device with touch panel 8, on a back surface of the touch panel substrate 10 on which sensor electrodes (X electrodes 11 and Y electrodes 12) and the like are formed, a black matrix 712, color filters 713, and a common electrode 714 are formed. In other words, the-color-filter-equipped touch panel substrate 81 has functions as a touch panel and functions as a color filter.

As compared with the display device with touch panel 7, the display device with touch panel 8 does not need the substrate 711 and the pasting material 77. Therefore, the device can be formed thinner, and the light transmission degree can be improved.

In the display device with touch panel 8, the sensor electrodes are formed of a surface of the substrate 10 on a side opposite to the liquid crystal 74 side. The sensor electrodes, however, may be formed on a surface of the substrate 10 on which the black matrix 712 and the like are formed. Here, a flattening film and the like may be formed therebetween.

In the display device with touch panel 8, the color-filter-equipped touch panel substrate 81 may include any one of the touch panels 2 to 4, in place of the touch panel 1.

So far, the embodiments of the present invention have been explained. The present invention, however, is not limited to the above-described embodiments, and can be modified variously within the scope of the invention. Further, the embodiments can be combined appropriately and implemented.

INDUSTRIAL APPLICABILITY

The present invention is industrially applicable as a touch panel and a display device with touch panel.

The invention claimed is:

1. A touch panel comprising:
an insulating substrate;
a first electrode on the substrate and extending in a first direction;
a second electrode on the substrate and extending in a second direction that crosses the first direction;
a first insulating film that insulates the first electrode and the second electrode from each other;
a terminal on the substrate; and
a line that electrically connects a respective one of the first and second electrodes with the terminal, wherein
the terminal includes a first conductive film in contact with a lower surface of the line, and a second conductive film in contact with an upper surface of the first conductive film,
the line and a second insulating film covering the line include an opening where the line and the terminal overlap when viewed in a plan view,
the first conductive film and the second conductive film are in contact with each other at the opening, and
the second conductive film is in contact with the line such that the contact is only on a side surface of the line in the opening.

2. The touch panel according to claim 1, wherein
the first electrode includes a plurality of first island electrodes that are arranged in the first direction, and a first connection part that connects adjacent ones of the first island electrodes,
the second electrode includes a plurality of second island electrodes that are arranged in the second direction, and a second connection part that connects adjacent ones of the second island electrodes,
the first island electrodes, the second island electrodes, the first connection part, and the first conductive film are formed with a same material, and
the second connection part and the second conductive film are formed with a same material.

3. The touch panel according to claim 1, wherein
the first electrode includes a plurality of first island electrodes that are arranged in the first direction, and a first connection part that connect adjacent ones of the first island electrodes,
the second electrode includes a plurality of second island electrodes that are arranged in the second direction, and a second connection part that connect adjacent ones of the second island electrodes,
the second connection part and the first conductive film are formed with a same material, and
the first island electrodes, the second island electrodes, the first connection part, and the second conductive film are formed with a same material.

4. The touch panel according to claim 1, wherein
the first electrode includes a plurality of first island electrodes that are arranged in the first direction, and a first connection part that connect adjacent ones of the first island electrodes,
the second electrode includes a plurality of second island electrodes that are arranged in the second direction, and a second connection part that connect adjacent ones of the second island electrodes, and
the first island electrodes, the second island electrodes, the first connection part, the second connection part, the first conductive film, and the second conductive film are formed with a same material.

5. The touch panel according to claim 1, wherein
the line and the second insulating film include a recess where the line and the terminal overlap when viewed in a plan view, and
the first conductive film and the second conductive film are in contact with each other at the recess.

6. The touch panel according to claim 1, wherein in the place where the first conductive film and the line overlap, the first conductive film has a width wider than that of the line.

7. The touch panel according to claim 1, wherein the first conductive film overlaps an entirety of the line when viewed in the plan view.

8. A display device with touch panel comprising:
a liquid crystal display device; and
the touch panel according to claim 1.

9. The display device with touch panel according to claim 8, wherein the liquid crystal display device includes a thin film transistor containing indium zinc gallium oxide.

10. The touch panel according to claim 2, wherein
the line and the second insulating film include a recess where the line and the terminal overlap when viewed in a plan view, and
the first conductive film and the second conductive film are in contact with each other at the recess.

11. The touch panel according to claim 4, wherein
the line and the second insulating film include a recess where the line and the terminal overlap when viewed in a plan view, and
the first conductive film and the second conductive film are in contact with each other at the recess.

12. The touch panel according to claim 1, wherein the second conductive film is a transparent conductive film.

* * * * *